United States Patent [19]
Levasseur

[11] Patent Number: 5,029,098
[45] Date of Patent: Jul. 2, 1991

[54] VEND SPACE ALLOCATION MONITOR MEANS AND METHOD

[75] Inventor: Joseph L. Levasseur, Chesterfield, Mo.

[73] Assignee: Coin Acceptors, Inc., St. Louis, Mo.

[21] Appl. No.: 303,547

[22] Filed: Jan. 27, 1989

[51] Int. Cl.$^5$ .................. G06F 15/00; G06F 15/20; G07F 11/00

[52] U.S. Cl. .................. 364/479; 364/403; 221/2

[58] Field of Search .................. 221/2, 4, 5, 94, 95, 221/7, 119, 121, 109, 133; 364/403, 479, 478, 479, 403, 554; 377/13, 15

[56] References Cited

U.S. PATENT DOCUMENTS

| | | | |
|---|---|---|---|
| 4,412,292 | 10/1983 | Sedam et al. | 364/479 |
| 4,598,378 | 7/1986 | Giacomo | 364/479 |
| 4,639,875 | 1/1987 | Abraham et al. | 364/479 |
| 4,654,800 | 3/1987 | Hayashi et al. | 364/479 |
| 4,801,375 | 1/1989 | Padilla | 364/479 |
| 4,834,231 | 5/1989 | Awane et al. | 364/479 |
| 4,847,764 | 7/1989 | Halvorson | 364/479 |

Primary Examiner—Jerry Smith
Assistant Examiner—Jim Trammell
Attorney, Agent, or Firm—Haverstock, Garrett & Roberts

[57] ABSTRACT

A vend space allocation monitor apparatus and method for use with a vending system capable of vending from among a plurality of classes of selectable vendable products of product from a selected product class, which vending system has a plurality of product storage areas and an established vend space allocation configuration allocating the product storage areas to the classes of selectable vendable products, the vend space allocation monitor apparatus including a vend selection monitoring portion for monitoring over a period of time the historical demand for the various classes of selectable vendable products, a determining portion for determining, based at least in part upon said historical demand, whether such established vend space allocation configuration is consistent with selection demand norms, and a display communciating to authorized personnel such determination, whereby such authorized personnel may, if they so desire, undertake a re-configuration of vend space allocation for such vending system.

73 Claims, 15 Drawing Sheets

PRODUCT SALES ACTIVITY

| PRODUCT | A | B | C | D | E | F | G | H | TOTAL |
|---|---|---|---|---|---|---|---|---|---|
| % ALLOC. | 16.67 | 16.67 | 16.67 | 12.50 | 12.50 | 8.33 | 8.33 | 8.33 | 100 |
| DAY 1 | 16 | 14 | 4 | 5 | 4 | 2 | 4 | 0 | 49 |
| DAY 2 | 22 | 12 | 7 | 2 | 3 | 4 | 2 | 1 | 53 |
| DAY 3 | 21 | 13 | 5 | 3 | 7 | 5 | 1 | 3 | 58 |
| DAY 4 | 13 | 11 | 4 | 3 | 4 | 3 | 1 | 2 | |
| ------1ST SELL-OUT------ | | | | | | | | | |
| | 0 | 6 | 4 | 3 | 2 | 0 | 2 | 1 | 59 |
| DAY 5 | 0 | 16 | 10 | 16 | 7 | 1 | 6 | 4 | 60 |
| DAY 6 | 0 | 0 | 15 | 9 | 7 | 4 | 3 | 4 | 42 |
| DAY 7 | 0 | 0 | 14 | 7 | 8 | 4 | 4 | 4 | 41 |
| TOTAL DELVD. BY SERVICE DATE | 72 | 72 | 63 | 48 | 42 | 23 | 23 | 19 | 362 |
| TOTAL DELVD. BY 1ST SELL-OUT | 72 | 50 | 20 | 13 | 18 | 14 | 8 | 6 | 201 |
| % DISTR. AT 1ST SELL-OUT | 35.82 | 24.88 | 9.95 | 6.47 | 8.96 | 6.97 | 3.98 | 2.99 | 100 |
| Δ% > 2.08 | YES (LOW) | YES (LOW) | YES (HIGH) | YES (HIGH) | YES (HIGH) | NO | YES (HIGH) | YES (HIGH) | |
| Δ% > 4.17 | YES (LOW) | YES (LOW) | YES (HIGH) | YES (HIGH) | NO | NO | YES (HIGH) | YES (HIGH) | |
| Δ% > 6.25 | YES (LOW) | YES (LOW) | YES (HIGH) | NO | NO | NO | NO | NO | |
| Δ% > 8.33 | YES (LOW) | NO | NO | NO | NO | NO | NO | NO | |

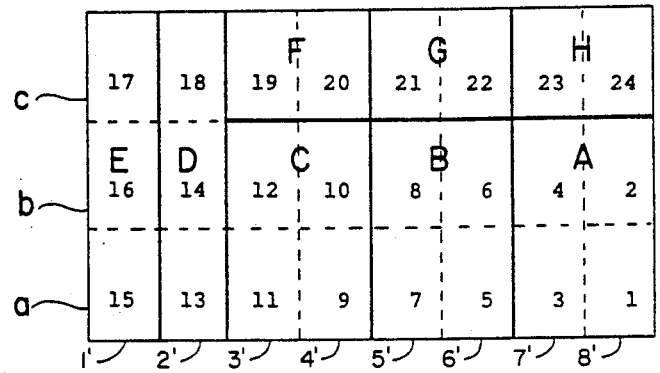

FIG. 9

| SELECTION | TOTAL CAPACITY | PRODUCT ALLOCATION % | PRODUCT AVAILABILITY AT SERVICING |
|---|---|---|---|
| SELECTION A | 72 | 16.67 | EMPTY |
| SELECTION B | 72 | 16.67 | EMPTY |
| SELECTION C | 72 | 16.67 | 9 |
| SELECTION D | 54 | 12.50 | 16 |
| SELECTION E | 54 | 12.50 | 12 |
| SELECTION F | 36 | 8.33 | 13 |
| SELECTION G | 36 | 8.33 | 13 |
| SELECTION H | 36 | 8.33 | 17 |

FIG. 10

PRODUCT SALES ACTIVITY

| PRODUCT | A | B | C | D | E | F | G | H | TOTAL |
|---|---|---|---|---|---|---|---|---|---|
| % ALLOC. | 16.67 | 16.67 | 16.67 | 12.50 | 12.50 | 8.33 | 8.33 | 8.33 | 100 |
| DAY 1 | 16 | 14 | 4 | 5 | 4 | 2 | 4 | 0 | 49 |
| DAY 2 | 22 | 12 | 7 | 2 | 3 | 4 | 2 | 1 | 53 |
| DAY 3 | 21 | 13 | 5 | 3 | 7 | 5 | 1 | 3 | 58 |
| DAY 4 | 13 | 11 | 4 | 3 | 4 | 3 | 1 | 2 | |
| ---1ST SELL-OUT--- | | | | | | | | | |
| | 0 | 6 | 4 | 3 | 2 | 0 | 2 | 1 | 59 |
| DAY 5 | 0 | 16 | 10 | 16 | 7 | 1 | 6 | 4 | 60 |
| DAY 6 | 0 | 0 | 15 | 9 | 7 | 4 | 3 | 4 | 42 |
| DAY 7 | 0 | 0 | 14 | 7 | 8 | 4 | 4 | 4 | 41 |
| TOTAL DELVD. BY SERVICE DATE | 72 | 72 | 63 | 48 | 42 | 23 | 23 | 19 | 362 |
| TOTAL DELVD. BY 1ST SELL-OUT | 72 | 50 | 20 | 13 | 18 | 14 | 8 | 6 | 201 |
| % DISTR. AT 1ST SELL-OUT | 35.82 | 24.88 | 9.95 | 6.47 | 8.96 | 6.97 | 3.98 | 2.99 | 100 |
| Δ% > 2.08 | YES (LOW) | YES (LOW) | YES (HIGH) | YES (HIGH) | YES (HIGH) | NO | YES (HIGH) | YES (HIGH) | |
| Δ% > 4.17 | YES (LOW) | YES (LOW) | YES (HIGH) | YES (HIGH) | NO | NO | YES (HIGH) | YES (HIGH) | |
| Δ% > 6.25 | YES (LOW) | YES (LOW) | YES (HIGH) | NO | NO | NO | NO | NO | |
| Δ% > 8.33 | YES (LOW) | NO | NO | NO | NO | NO | NO | NO | |

FIG. 11

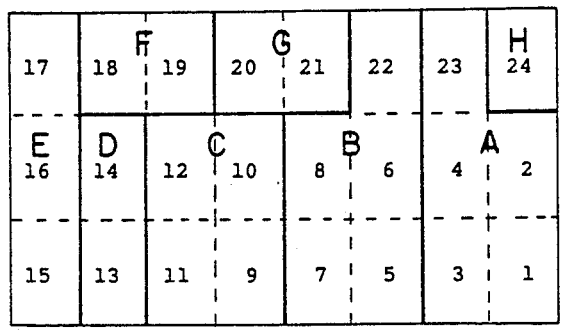

FIG. 12

| SELECTION | TOTAL CAPACITY | PRODUCT ALLOCATION % | PRODUCT AVAILABILITY AT SERVICING |
|---|---|---|---|
| SELECTION A | 90 | 20.83 | EMPTY |
| SELECTION B | 90 | 20.83 | EMPTY |
| SELECTION C | 72 | 16.67 | 17 |
| SELECTION D | 36 | 8.33 | 2 |
| SELECTION E | 54 | 12.50 | 17 |
| SELECTION F | 36 | 8.33 | 10 |
| SELECTION G | 36 | 8.33 | 11 |
| SELECTION H | 18 | 4.17 | EMPTY |

FIG. 13

PRODUCT SALES ACTIVITY

| PRODUCT | A | B | C | D | E | F | G | H | TOTAL |
|---|---|---|---|---|---|---|---|---|---|
| % ALLOC. | 20.83 | 20.83 | 16.67 | 8.33 | 12.50 | 8.33 | 8.33 | 4.17 | 100 |
| DAY 1 | 15 | 12 | 3 | 4 | 5 | 3 | 3 | 3 | 48 |
| DAY 2 | 14 | 12 | 8 | 3 | 6 | 2 | 4 | 2 | 51 |
| DAY 3 | 21 | 13 | 6 | 5 | 4 | 4 | 1 | 4 | 58 |
| DAY 4 | 24 | 15 | 5 | 4 | 3 | 5 | 3 | 2 | 61 |
| Day 5 | 16 | 14 | 5 | 4 | 4 | 3 | 3 | 2 | |
| ---1ST SELL-OUT--- | | | | | | | | | |
| | 0 | 4 | 2 | 1 | 1 | 0 | 0 | 0 | 59 |
| DAY 6 | 0 | 20 | 11 | 6 | 8 | 4 | 5 | 3 | 57 |
| DAY 7 | 0 | 0 | 15 | 7 | 6 | 5 | 6 | 2 | 41 |
| TOTAL DELVD. BY SERVICE DATE | 90 | 90 | 55 | 34 | 37 | 26 | 25 | 18 | 375 |
| TOTAL DELVD. BY 1ST SELL-OUT | 90 | 66 | 27 | 20 | 22 | 17 | 14 | 13 | 269 |
| % DISTR. AT 1ST SELL-OUT | 33.46 | 24.54 | 10.04 | 7.43 | 8.18 | 6.32 | 5.20 | 4.83 | 100 |
| Δ% > 2.08 | YES (LOW) | YES (LOW) | YES (HIGH) | NO | YES (HIGH) | NO | YES (HIGH) | NO | |
| Δ% > 4.17 | YES (LOW) | NO | YES (HIGH) | NO | YES (HIGH) | NO | NO | NO | |
| Δ% > 6.25 | YES (LOW) | NO | YES (HIGH) | NO | NO | NO | NO | NO | |
| Δ% > 8.33 | YES (LOW) | NO | NO | NO | NO | NO | NO | NO | |

FIG. 14

|   |   | E |   | F |   | G |   | H |
|---|---|---|---|---|---|---|---|---|
| 17 | 18 | 19 | 20 | 21 | 22 | 23 | 24 |
| C | D | | B | | | A | | |
| 16 | 14 | 12 | 10 | 8 | 6 | 4 | 2 |
| 15 | 13 | 11 | 9 | 7 | 5 | 3 | 1 |

FIG. 15

| SELECTION | TOTAL CAPACITY | PRODUCT ALLOCATION % | PRODUCT AVAILABILITY AT SERVICING |
|---|---|---|---|
| SELECTION A | 108 | 25.00 | EMPTY |
| SELECTION B | 108 | 25.00 | 5 |
| SELECTION C | 54 | 12.50 | 8 |
| SELECTION D | 36 | 8.33 | 6 |
| SELECTION E | 36 | 8.33 | EMPTY |
| SELECTION F | 36 | 8.33 | 9 |
| SELECTION G | 36 | 8.33 | 14 |
| SELECTION H | 18 | 4.17 | 1 |

FIG. 16

PRODUCT SALES ACTIVITY

| PRODUCT | A | B | C | D | E | F | G | H | TOTAL |
|---|---|---|---|---|---|---|---|---|---|
| % ALLOC. | 25.00 | 25.00 | 12.50 | 8.33 | 8.33 | 8.33 | 8.33 | 4.17 | 100 |
| DAY 1 | 16 | 13 | 4 | 2 | 6 | 4 | 2 | 3 | 50 |
| DAY 2 | 14 | 12 | 6 | 4 | 5 | 3 | 3 | 1 | 48 |
| DAY 3 | 19 | 13 | 3 | 5 | 2 | 3 | 4 | 2 | 51 |
| DAY 4 | 23 | 12 | 5 | 3 | 8 | 3 | 1 | 1 | 56 |
| DAY 5 | 20 | 14 | 7 | 4 | 5 | 5 | 4 | 3 | 62 |
| DAY 6 | 16 | 14 | 7 | 3 | 4 | 4 | 3 | 2 | |
| ---1ST SELL-OUT--- | | | | | | | | | |
| | 0 | 4 | 4 | 1 | 0 | 1 | 0 | 2 | 65 |
| DAY 7 | 0 | 21 | 10 | 8 | 6 | 4 | 5 | 3 | 57 |
| TOTAL DELVD. BY SERVICE DATE | 108 | 103 | 46 | 30 | 36 | 27 | 22 | 17 | 389 |
| TOTAL DELVD. BY 1ST SELL-OUT | 108 | 78 | 32 | 21 | 30 | 22 | 17 | 12 | 320 |
| % DISTR. AT 1ST SELL-OUT | 33.75 | 24.38 | 10.00 | 6.56 | 9.38 | 6.88 | 5.31 | 3.75 | 100 |
| Δ% > 2.08 | YES (LOW) | NO | NO | NO | NO | NO | YES (HIGH) | NO | |
| Δ% > 4.17 | YES (LOW) | NO | NO | NO | NO | NO | NO | NO | |
| Δ% > 6.25 | YES (LOW) | NO | NO | NO | NO | NO | NO | NO | |
| Δ% > 8.33 | NO | NO | NO | NO | NO | NO | NO | NO | |

| SELECTION | TOTAL CAPACITY | PRODUCT ALLOCATION % | PRODUCT AVAILABILITY AT SERVICING |
|---|---|---|---|
| SELECTION A | 126 | 29.17 | EMPTY |
| SELECTION B | 108 | 25.00 | 10 |
| SELECTION C | 54 | 12.50 | 7 |
| SELECTION D | 36 | 8.33 | 7 |
| SELECTION E | 36 | 8.33 | EMPTY |
| SELECTION F | 36 | 8.33 | 12 |
| SELECTION G | 18 | 4.17 | EMPTY |
| SELECTION H | 18 | 4.17 | 2 |

FIG. 19

PRODUCT SALES ACTIVITY

| PRODUCT | A | B | C | D | E | F | G | H | TOTAL |
|---|---|---|---|---|---|---|---|---|---|
| % ALLOC. | 29.17 | 25.00 | 12.50 | 8.33 | 8.33 | 8.33 | 4.17 | 4.17 | 100 |
| DAY 1 | 15 | 14 | 6 | 4 | 5 | 3 | 3 | 2 | 52 |
| DAY 2 | 21 | 15 | 8 | 3 | 7 | 2 | 1 | 2 | 59 |
| DAY 3 | 19 | 13 | 5 | 5 | 6 | 2 | 4 | 1 | 55 |
| DAY 4 | 17 | 14 | 7 | 4 | 6 | 4 | 3 | 3 | 58 |
| DAY 5 | 22 | 12 | 8 | 4 | 4 | 5 | 4 | 2 | 61 |
| DAY 6 | 18 | 13 | 5 | 5 | 4 | 3 | 2 | 4 | 54 |
| DAY 7 | 13 | 10 | 5 | 2 | 3 | 2 | 1 | 2 | |
| ----------1ST SELL-OUT---------- | | | | | | | | | |
| | 1 | 7 | 3 | 2 | 1 | 2 | 0 | 0 | 54 |
| TOTAL DELVD. BY SERVICE DATE | 126 | 98 | 47 | 29 | 36 | 23 | 18 | 16 | 393 |
| TOTAL DELVD. BY 1ST SELL-OUT | 125 | 91 | 44 | 27 | 35 | 21 | 17 | 16 | 376 |
| % DISTR. AT 1ST SELL-OUT | 33.24 | 24.20 | 11.70 | 7.18 | 9.31 | 5.59 | 4.52 | 4.26 | 100 |
| Δ% > 2.08 | YES (LOW) | NO | NO | NO | NO | YES (HIGH) | NO | NO | |
| Δ% > 4.17 | NO | NO | NO | NO | NO | NO | NO | NO | |
| Δ% > 6.25 | NO | NO | NO | NO | NO | NO | NO | NO | |
| Δ% > 8.33 | NO | NO | NO | NO | NO | NO | NO | NO | |

| SELECTION | TOTAL CAPACITY | PRODUCT ALLOCATION % | PRODUCT AVAILABILITY AT SERVICING |
|---|---|---|---|
| SELECTION A | 144 | 33.33 | EMPTY |
| SELECTION B | 108 | 25.00 | 3 |
| SELECTION C | 54 | 12.50 | 8 |
| SELECTION D | 36 | 8.33 | 6 |
| SELECTION E | 36 | 8.33 | EMPTY |
| SELECTION F | 18 | 4.17 | EMPTY |
| SELECTION G | 18 | 4.17 | EMPTY |
| SELECTION H | 18 | 4.17 | 2 |

FIG. 22

PRODUCT SALES ACTIVITY

| PRODUCT | A | B | C | D | E | F | G | H | TOTAL |
|---|---|---|---|---|---|---|---|---|---|
| % ALLOC. | 33.33 | 25.00 | 12.50 | 8.33 | 8.33 | 4.17 | 4.17 | 4.17 | 100 |
| DAY 1 | 19 | 15 | 5 | 4 | 5 | 2 | 2 | 2 | 54 |
| DAY 2 | 21 | 15 | 7 | 5 | 6 | 4 | 4 | 1 | 63 |
| DAY 3 | 22 | 12 | 8 | 3 | 5 | 3 | 3 | 3 | 59 |
| DAY 4 | 23 | 17 | 8 | 5 | 7 | 4 | 1 | 3 | 68 |
| DAY 5 | 18 | 15 | 6 | 5 | 6 | 3 | 4 | 1 | 58 |
| DAY 6 | 20 | 12 | 6 | 4 | 5 | 2 | 3 | 1 | |
| ---1ST SELL-OUT--- | 2 | 2 | 1 | 0 | 0 | 0 | 0 | 1 | 59 |
| DAY 7 | 19 | 17 | 5 | 4 | 2 | 0 | 1 | 4 | 52 |
| TOTAL DELVD. BY SERVICE DATE | 144 | 105 | 46 | 30 | 36 | 18 | 18 | 16 | 413 |
| TOTAL DELVD. BY 1ST SELL-OUT | 123 | 86 | 40 | 26 | 34 | 18 | 17 | 11 | 355 |
| % DISTR. AT 1ST SELL-OUT | 34.65 | 24.23 | 11.27 | 7.32 | 9.58 | 5.07 | 4.79 | 3.10 | 100 |
| Δ% > 2.08 | NO | NO | NO | NO | NO | NO | NO | NO | |
| Δ% > 4.17 | NO | NO | NO | NO | NO | NO | NO | NO | |
| Δ% > 6.25 | NO | NO | NO | NO | NO | NO | NO | NO | |
| Δ% > 8.33 | NO | NO | NO | NO | NO | NO | NO | NO | |

| SELECTION | TOTAL CAPACITY | PRODUCT ALLOCATION % | PRODUCT AVAILABILITY AT SERVICING |
|---|---|---|---|
| SELECTION A | 144 | 33.33 | 4 |
| SELECTION B | 108 | 25.00 | 4 |
| SELECTION C | 54 | 12.50 | 9 |
| SELECTION D | 36 | 8.33 | 6 |
| SELECTION E | 36 | 8.33 | EMPTY |
| SELECTION F | 18 | 4.17 | EMPTY |
| SELECTION G | 18 | 4.17 | 1 |
| SELECTION H | 18 | 4.17 | EMPTY |

FIG. 25

PRODUCT SALES ACTIVITY

| PRODUCT | A | B | C | D | E | F | G | H | TOTAL |
|---|---|---|---|---|---|---|---|---|---|
| % ALLOC. | 33.33 | 25.00 | 12.50 | 8.33 | 8.33 | 4.17 | 4.17 | 4.17 | 100 |
| DAY 1 | 17 | 14 | 6 | 4 | 5 | 2 | 2 | 2 | 52 |
| DAY 2 | 21 | 17 | 7 | 5 | 7 | 3 | 3 | 3 | 66 |
| DAY 3 | 20 | 13 | 7 | 3 | 6 | 3 | 2 | 3 | 57 |
| DAY 4 | 22 | 16 | 9 | 4 | 6 | 4 | 3 | 3 | 67 |
| DAY 5 | 19 | 14 | 5 | 5 | 5 | 3 | 2 | 2 | 55 |
| DAY 6 | 16 | 12 | 5 | 5 | 4 | 3 | 3 | 3 | |
| ---1ST SELL-OUT--- | 3 | 2 | 1 | 0 | 1 | 0 | 0 | 0 | 58 |
| DAY 7 | 22 | 16 | 5 | 4 | 2 | 0 | 2 | 2 | 53 |
| TOTAL DELVD. BY SERVICE DATE | 140 | 104 | 45 | 30 | 36 | 18 | 17 | 18 | 408 |
| TOTAL DELVD. BY 1ST SELL-OUT | 115 | 86 | 39 | 26 | 33 | 18 | 15 | 16 | 348 |
| % DISTR. AT 1ST SELL-OUT | 33.05 | 24.71 | 11.21 | 7.47 | 9.48 | 5.17 | 4.31 | 4.60 | 100 |
| Δ% > 2.08 | NO | NO | NO | NO | NO | NO | NO | NO | |
| Δ% > 4.17 | NO | NO | NO | NO | NO | NO | NO | NO | |
| Δ% > 6.25 | NO | NO | NO | NO | NO | NO | NO | NO | |
| Δ% > 8.33 | NO | NO | NO | NO | NO | NO | NO | NO | |

FIG. 26

VEND ACTIVITY SUMMARY
(OVER SEVERAL SERVICE PERIODS)

| SERVICE PERIOD | | PRODUCT | A | B | C | D | E | F | G | H | TOTAL |
|---|---|---|---|---|---|---|---|---|---|---|---|
| | | % ALLOC. | 33.33 | 25.00 | 12.50 | 8.33 | 8.33 | 4.17 | 4.17 | 4.17 | 100 |
| 1 | | TOTAL AT 1ST SELL-OUT | 123 | 86 | 40 | 26 | 34 | 18 | 17 | 11 | 355 |
| | | % DISTR. | 34.65 | 24.23 | 11.27 | 7.32 | 9.58 | 5.07 | 4.79 | 3.10 | 100 |
| 2 | | TOTAL AT 1ST SELL-OUT | 115 | 86 | 39 | 26 | 33 | 18 | 15 | 16 | 348 |
| | | % DISTR. | 33.05 | 24.71 | 11.21 | 7.47 | 9.48 | 5.17 | 4.31 | 4.60 | 100 |
| 3 | | TOTAL AT 1ST SELL-OUT | 119 | 83 | 38 | 27 | 31 | 18 | 16 | 14 | 346 |
| | | % DISTR. | 34.39 | 23.99 | 10.98 | 7.80 | 8.96 | 5.20 | 4.62 | 4.05 | 100 |
| 4 | | TOTAL AT 1ST SELL-OUT | 83 | 59 | 28 | 19 | 21 | 18 | 12 | 9 | 249 |
| | | % DISTR. | 33.33 | 23.69 | 11.24 | 7.63 | 8.43 | 7.23 | 4.82 | 3.61 | 100 |
| | | PRODUCT TOTALS FOR ALL PERIODS AT 1ST SELL-OUTS | 440 | 314 | 145 | 98 | 119 | 72 | 60 | 50 | 1298 |
| | | % DISTR. | 33.90 | 24.19 | 11.17 | 7.55 | 9.17 | 5.55 | 4.62 | 3.85 | 100 |

FIG. 27

VEND SPACE ALLOCATION MONITOR MEANS AND METHOD

BACKGROUND OF THE INVENTION

The present invention relates to a vend space allocation monitor means and method, and, more particularly, to a means and method for monitoring and determining whether an established vend space allocation configuration for a given vend system that has a plurality of allocatable vend product storage areas is consistent with a historical demand for the various vend product selections. Such vend space allocation monitor means and method are particularly useful with vend systems for selectively dispensing or vending several different types of products from product storage columns, especially for products that are of generally cylindrical configurations, such as bottles or cans, and with vend systems that have a greater number of allocatable vend product storage areas than vend product selections.

Over the years a variety of approaches have been utilized in attempts to match product stocking of a vending machine to the perceived demand for the various products to be vended therefrom. Among such approaches have been the use of multiple columns with their associated selection and product delivery means for vending major products and single columns with their associated selection and product delivery means for vending secondary products, the use of multiple columns with common selection and/or product delivery means for vending major products and single columns with their associated selection and product delivery means for vending secondary products, the use of differently sized columns to permit the stacking of cans or like items in double as opposed to single stacks, the use of half-height columns which permits secondary products to be stored in such smaller sized columns while major products are stored in full-height columns that may open out above the half-height columns, the use of columns of staggered heights with inclined racks or other storage areas above selected ones of the staggered height columns to obtain product storage compartments of varying capacities, and the use of column transfer means such as column transfer shelves, gates, and trap doors which permit those products stored above a certain level in one column to be transferred into another column for vending therefrom, some of which approaches have permitted service personnel, at the time of restocking of a particular vending machine, to set, adjust, or re-position certain elements in such particular vending machine so that the product storage therein will more closely match the empirical demand for products observed by such service personnel.

Patents such as U.S. Pat. Nos. 4,245,755; 4,699,295; and 4,705,176 all discuss the difficulties and history of trying to develop vending systems wherein product storage space can be optimally allocated to the various product types that are desired to be vended therefrom, and all illustrate approaches to the problem of space to sales allocation. While there has been considerable work devoted to the design of vending machines that will permit optimal allocation of product storage space to anticipated product demand and considerable discussion regarding the desirability of matching the product stocking of a vending machine to the sales therefrom, there has been little discussion regarding the manner in which it is determined whether or to what extent a particular space to sales allocation scheme is acceptable.

In many instances product demand may vary from location to location and machine to machine. While pre-established space to sales configurations may be established based upon national or regional statistics regarding the relative popularity of various products desired to be vended from a particular machine, it often falls upon the service personnel to determine from their observations when servicing a machine how closely the anticipated product demand corresponds to sales from that machine. If one or more types of product are consistently sold out every time the machine is serviced while other types of product remain available in abundance, the particular space to sales allocation scheme being employed is clearly not appropriate. Because of the obvious inappropriateness of the space to sales allocation scheme most service personnel would recognize the desirability o attempting in some way to compensate for or to revise or tailor the space to sales allocation scheme. Some of the tricks of the trade that may be employed by the service personnel are discussed in U.S. Pat. No. 4,705,176. In certain instances, if the product storage areas of the machine can be reconfigured in some manner, the service personnel may be able, based upon their observations regarding the perceived relative popularity of the products being vended, to reposition certain column transfer elements or other reconfiguration means to attempt to obtain a closer match between allocated product storage and product demand. Even if machine reconfiguration is possible, a number of machine reconfigurations, using trial and error approaches based upon observations of product availability at the time of machine servicing, may be necessary before service personnel are able to observe during a subsequent servicing of the machine that the mismatch between product storage allocation and product demand has been resolved.

While obvious mismatch conditions may be determinable by service personnel from their observations upon servicing the machine, less obvious mismatch conditions may well escape recognition by even the most observant service personnel over extended periods of time, and, even if eventually recognized, may prove difficult to overcome by trial and error approaches. This is especially true if there is a significant mix of products in the machine or if changes in one or more products of the product mix are made.

SUMMARY OF THE INVENTION

Accordingly, the present invention is designed as a vend space allocation monitor means and method that can be employed to facilitate the identification of mismatch conditions between a vend space allocation scheme and actual product demand or the degree of conformance of such vend space allocation scheme to product demand norms. Such vend space allocation monitor means is intended for use with a vending system that is capable of vending from among a plurality of classes of selectable vendable products a product from a selected product class, which vending system has a plurality of allocatable vend product storage areas and an established vend space allocation configuration allocating the product storage areas to the classes of selectable vendable products, and includes a vend selection monitoring means for monitoring over a period of time the historical demand for the various classes of selectable vendable products, means for determining, based at least in part upon such historical demand, whether such established vend space allocation configuration is consistent with selection demand norms, and means for communicating to authorized personnel such determination, whereby such authorized personnel may, if they so desire, and if reconfiguration of vend space allocation for such vending system is possible, undertake such a reconfiguration.

It is thus a principal object of the invention to provide a means and method for determining the degree of conformance of a vend space allocation configuration of a multi-selection vending system to the product demand norms for the various product selections.

Various other objects and advantages of the present invention will also become apparent to those skilled in the art after considering the following detailed specification in conjunction with the accompanying drawings, wherein:

BRIEF DESCRIPTION OF THE DRAWINGS

FIGS. 9, 12, 15, 18, 21, and 24 represent various allocation configurations of a vending machine constructed in accordance with FIG. 1.

FIGS. 10, 13, 16, 19, 22, and 25 are tables containing information pertinent, respectively, to FIGS. 9, 12, 15, 18, 21, and 24, including information identifying typical product availability status for the various product classes at the time of vending machine servicing.

FIGS. 11, 14, 17, 20, 23, and 26 are associated, respectively, with FIGS. 9, 12, 15, 18, 21, and 24, and also with FIGS. 10, 13, 16, 19, 22, and 25, and illustrate both typical vend activity over one service period of a vending machine having Product allocation configurations as represented by FIGS. 9, 12, 15, 18, 21, and 24, which vend activity results in the product availability status set forth in FIGS. 10, 13, 16, 19, 22, and 25, and how the product demand during such service period can be utilized to determine whether the particular product allocation configuration is acceptable or may require revision.

FIG. 27 is a table illustrating typical vend activity over several service periods of a vending machine having product storage space allocated in accordance with FIG. 21.

DETAILED DESCRIPTION OF PREFERRED EMBODIMENTS

Figure 1:
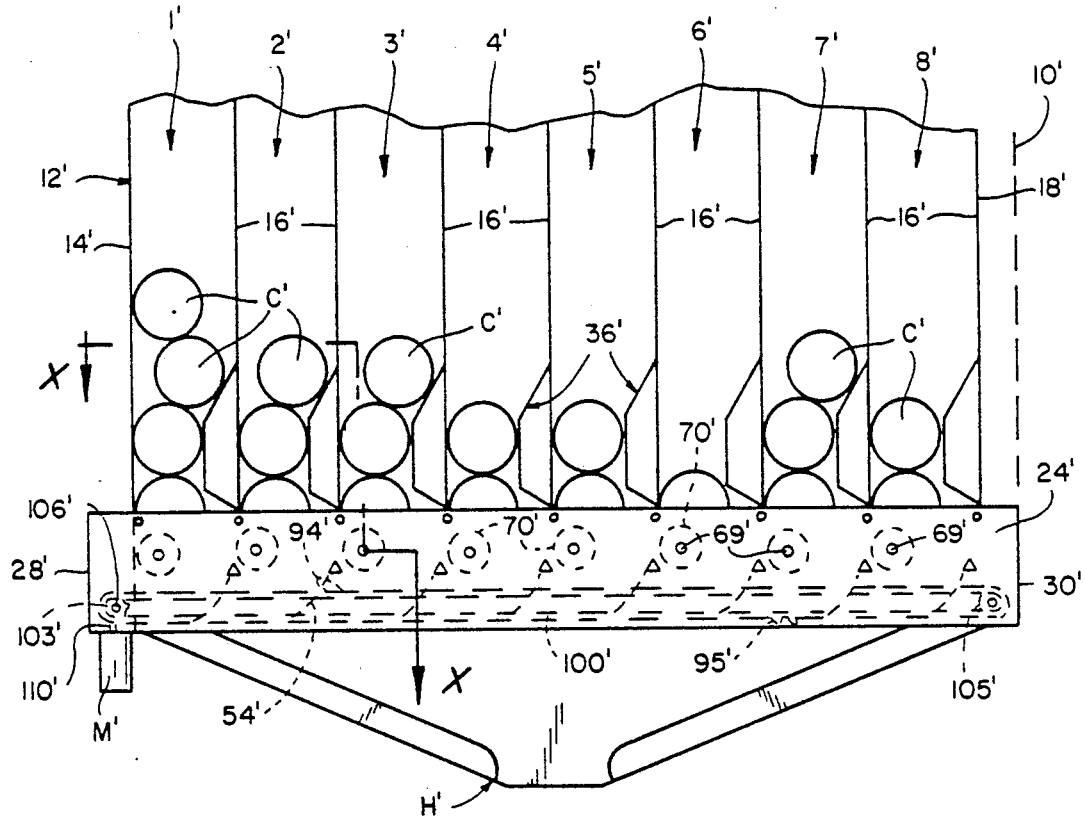
FIG. 1 is a schematic front view of the lower portion of a vending machine having a columnar product feed to the product delivery mechanism.

Referring now to the drawings, wherein like reference numbers refer to like items, FIGS. 1, 5, 6, and 7 of this application correspond, respectively, to FIGS. 1, 3, 12, and 10 of Applicant's co-pending U.S. patent application Ser. No. 230,963, also assigned to Applicant's assignee. All reference numbers in the present application which include as part of the number the prime symbol (') correspond to like non-prime reference numbers in U.S. Pat. application Ser. No. 230,963 and identify elements the descriptions of which and discussions about which in U.S. patent application Ser. No. 230,963 are incorporated herein by reference.

Figure 5:
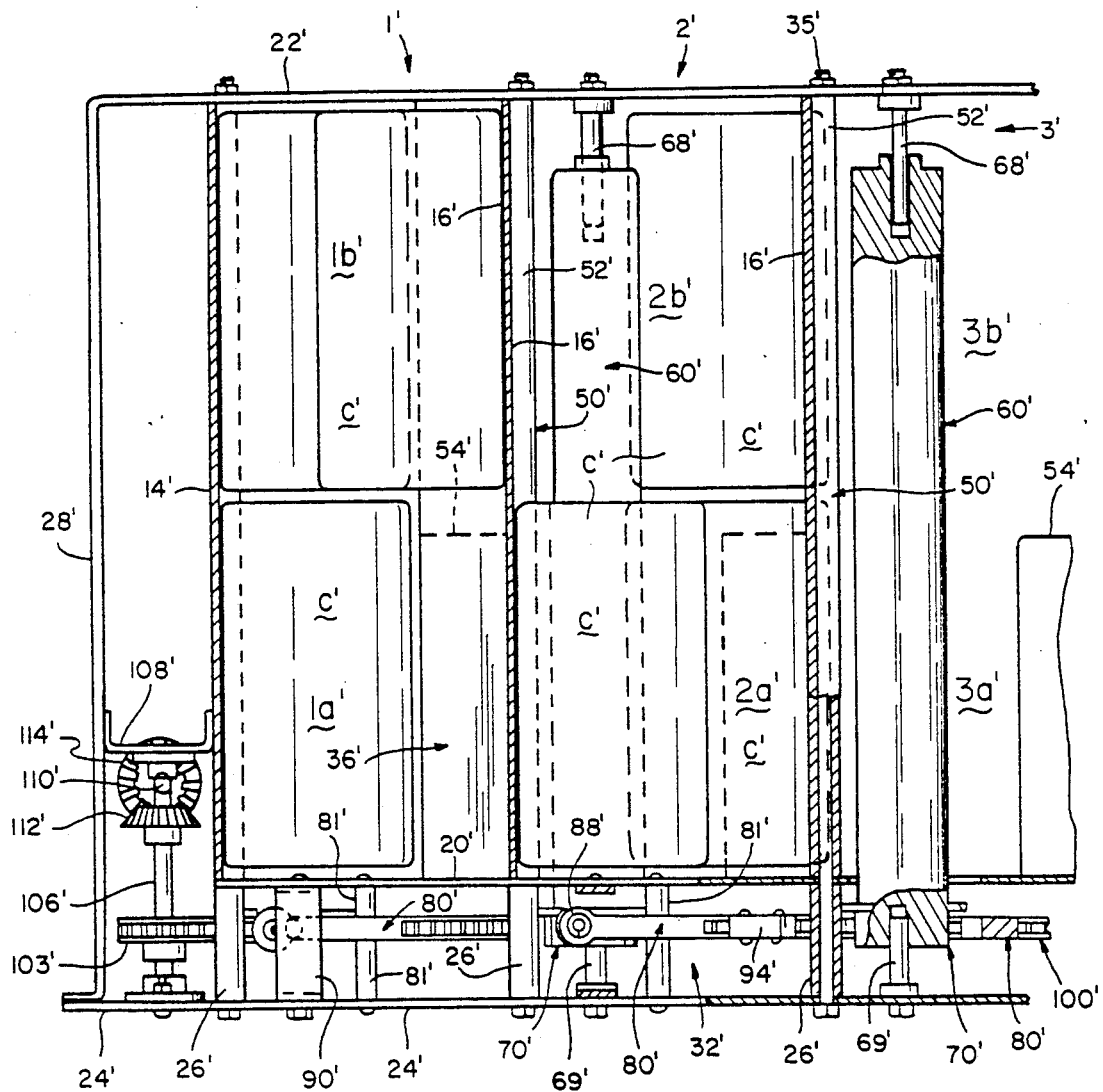
FIGS. 5-7 are top plan views, partly in section, taken generally along line X—X in FIG. 1, showing several possible front to back product storage configurations of the vending machine of FIG. 1 and a portion of the product delivery mechanism that can be advantageously used with such configurations.
Figure 6:
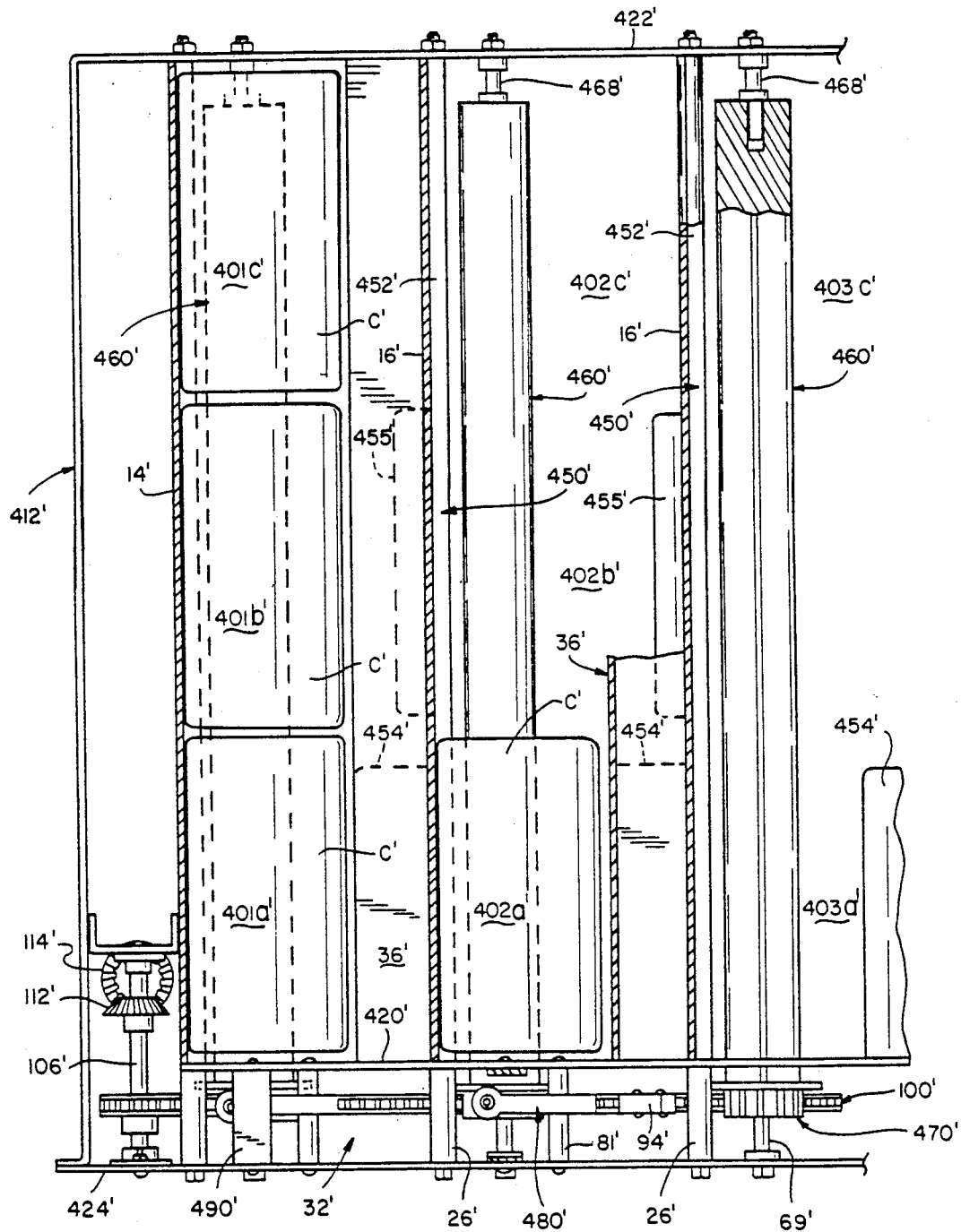
Figure 7:
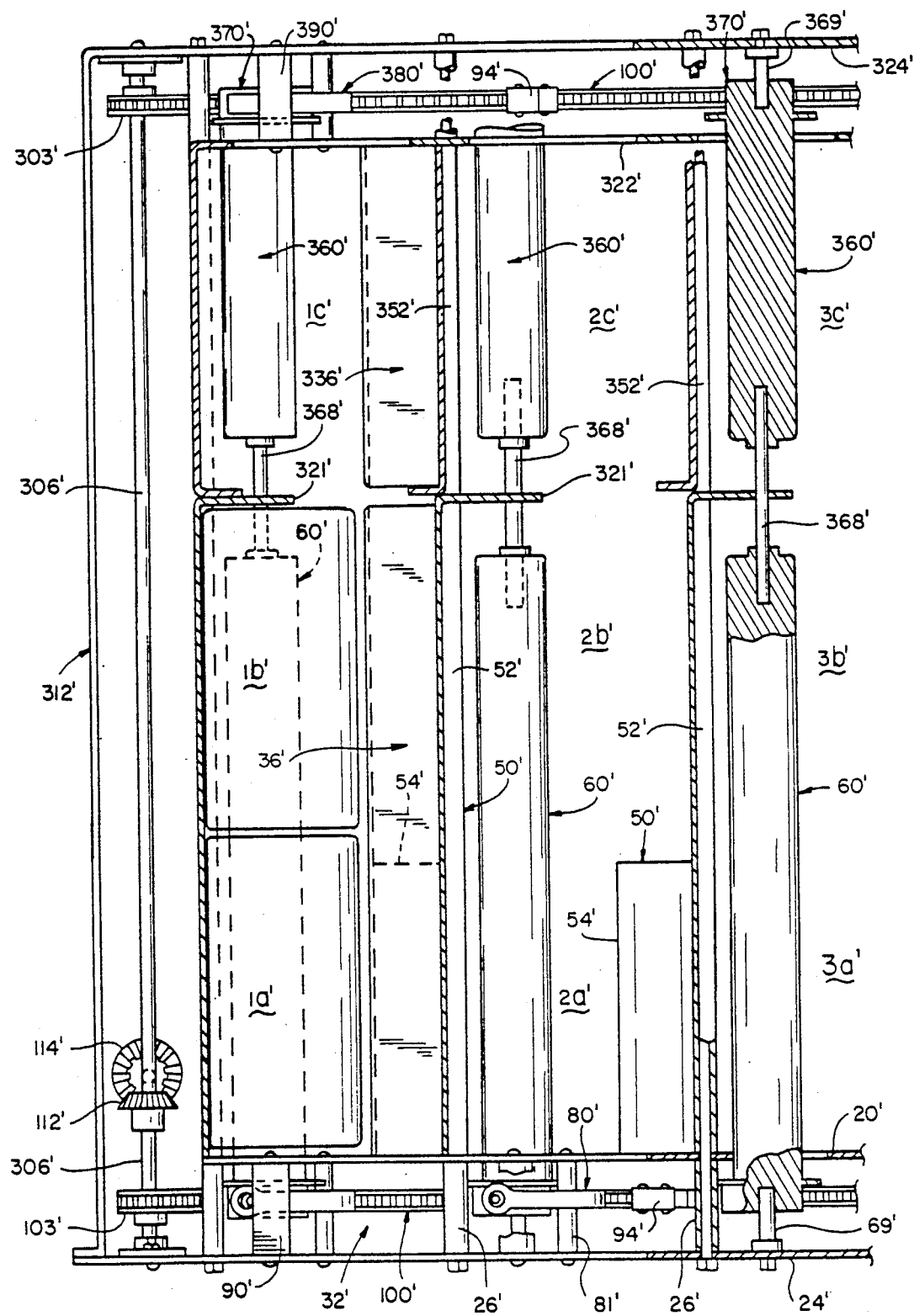

With particular reference now to FIG. 1, the number 10' identifies a vending machine the lower portion of which is so constructed, in the embodiment shown, to have along its width eight product storage columns 1'-8', each of which columns may be of sufficient depth to hold a plurality of products C' arranged in horizontal rows. As depicted in FIGS. 5 and 6, the depth of the columns may be varied to increase or decrease the number of products that may be stored in the horizontal rows, and, as depicted in FIG. 7, the columns may be partitioned from front to rear, such as by intermediate wall members 321', to create distinct product storage compartments in the vending machine. In the embodiment depicted in FIG. 7 the forward product storage compartment of each column is sized to hold two products arranged horizontally in an end-to-end configuration while the rear product storage compartment of each column is sized to hold only a single product. Thus, by way of illustration, column 1' is depicted as including portions 1'a, 1'b, and 1'c, with portions 1'a and 1'b defining a forward product storage compartment and portion 1'c defining a rear product storage compartment.

Figure 2:
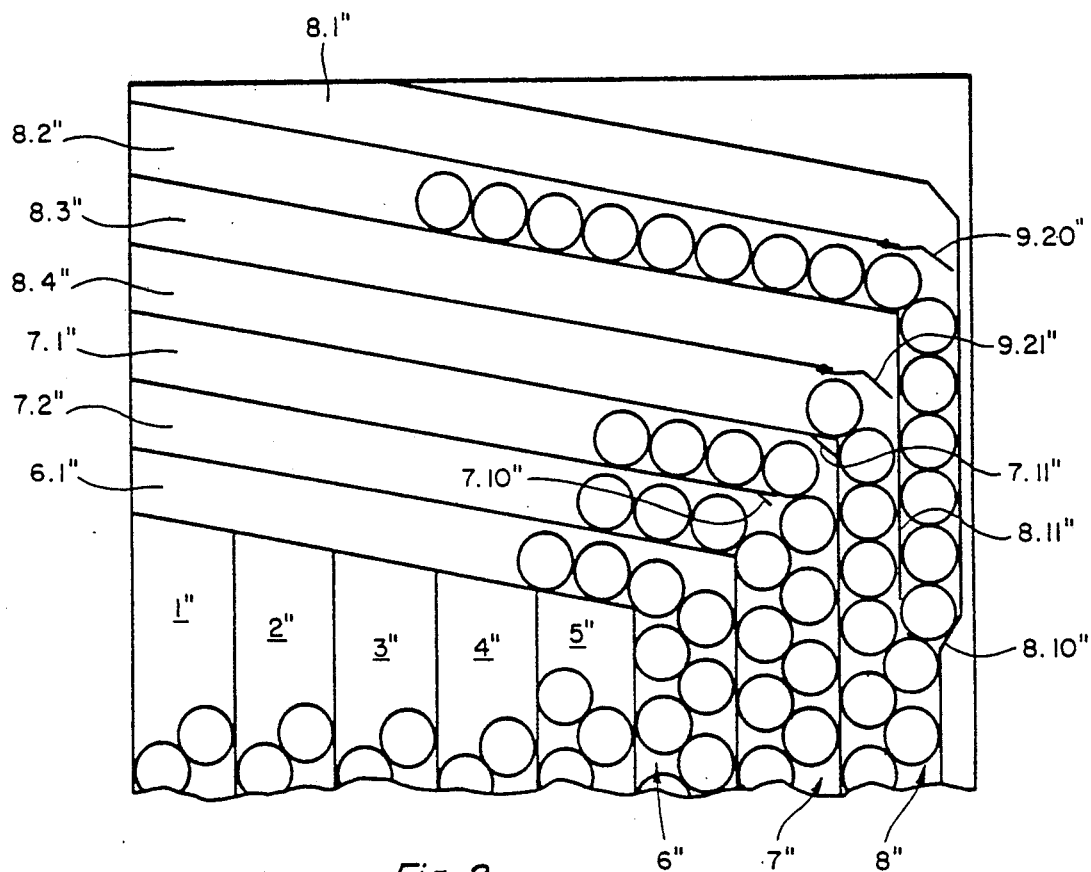
FIGS. 2-4 are schematic front views of several various upper portions of vending machines, which upper portions may be employed with the lower portion of FIG. 1.
Figure 3:
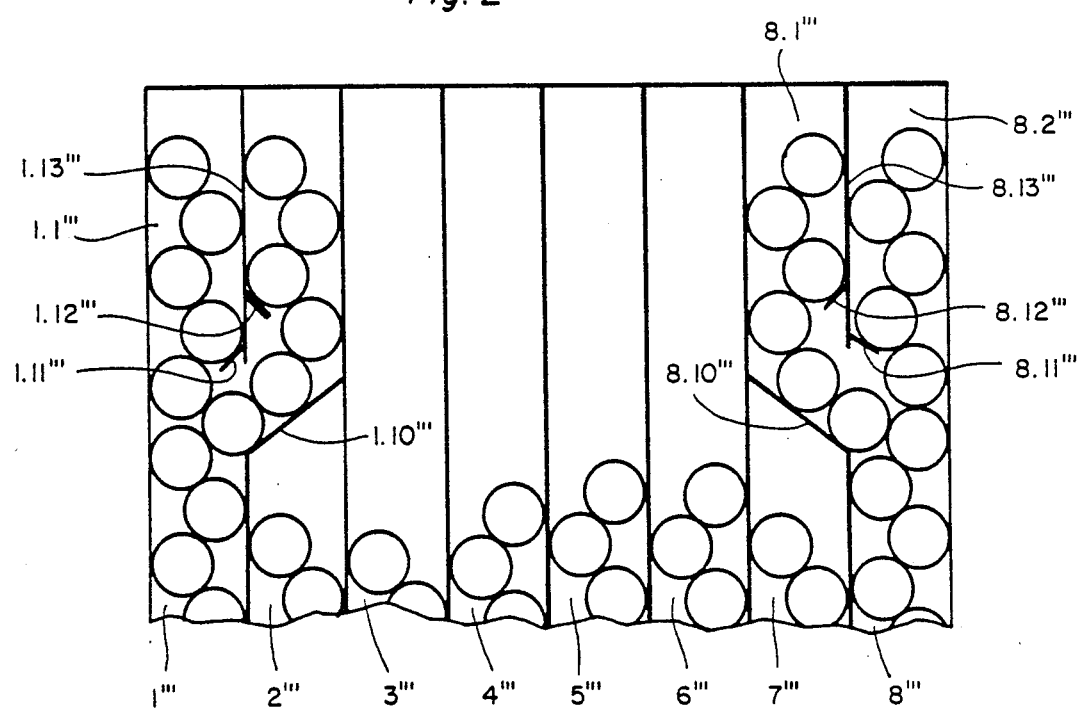
Figure 4:
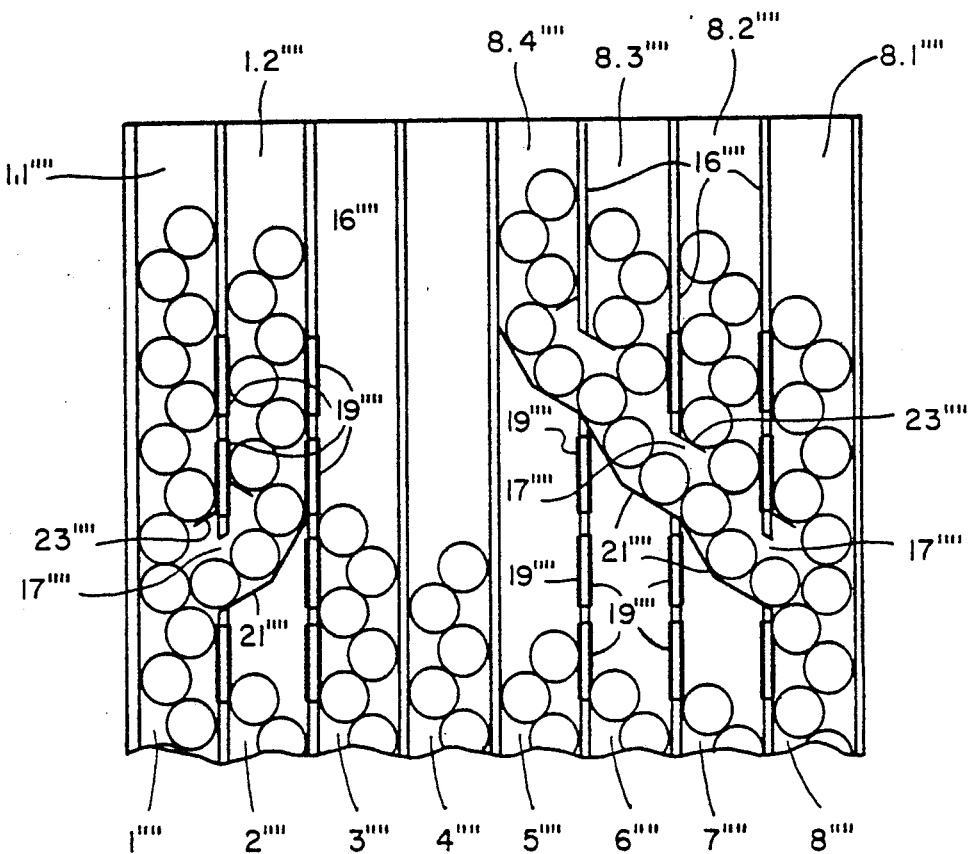

It will be appreciated that the vending machine 10' of FIG. 1 may be so constructed to have various upper portion embodiments that permit greater amounts of certain product types to be readily stored for vending. FIGS. 2-4 illustrate various possible embodiments of upper portions that could be so constructed to mate with the lower portion depicted in FIG. 1 and which exhibit various ways in which certain product types can be allocated greater storage space within the vending machine.

By way of example, the upper portion depicted in FIG. 2 includes upper column portions 1"-8" that correspond to and are constructed to feed products to columns 1'-8' of FIG. 1. Upper column portions 6"-8" have associated therewith angled storage compartments 6.1", 7.1", 7.2", 8.1", 8.2", 8.3", and 8.4" that extend over the tops of upper column portions 1"-5" and are so constructed that products stored in compartment 6.1" feed into upper column portion 6", products stored in compartments 7.1" and 7.2" feed into upper column portion 7", and products stored in compartments 8.1"-8.4" feed into upper column portion 8". Guide means 7.10" and 7.11" help channel the flow of products from compartments 7.1" and 7.2" into upper column portion 7" while guide means 8.10" and 8.11" and product gate means 8.20" and 8.21" help channel and control the flow of products from compartments 8.1"-8.4" into upper column portion 8".

FIG. 3 depicts another embodiment of an upper portion of a vending machine, which upper portion includes upper column portions 1'"-8'" that correspond to and are constructed to feed products to columns 1'-8' of FIG. 1. Upper column portions 3'"-6'" are depicted as full height columns, while upper column portions 2'" and 7'" are depicted as partial height columns and upper column portions 1'" and 8'" are depicted as columns with branched arms. Branch 1.1'" of upper column portion 1'" is shown extending directly above the lower portion of upper column portion 1'" and branch 1.2'" is shown disposed above upper column portion 2'". Similarly, branch 8.1'" of upper column portion 8'" is shown extending directly above the lower portion of upper column portion 8'" and branch 8.2'" is shown diposed above upper column portion 7'". Guide means 1.10'"-1.13'" help channel the flow of products from column arms 1.1'" and 1.2'" into the lower portion of upper column portion 1'" while guide means 8.10'"-8.13'" serve a similar purpose with respect to upper column portion 8'".

FIG. 4 depicts a still further embodiment of an upper portion of a vending machine wherein the upper portion includes upper column portions 1""-8"" that correspond to and are constructed to feed products to columns 1'-8' of FIG. 1. At least certain of the sidewalls 16"" between the upper column portions include openings 17"" therethrough, some of which openings are shown sealed by removable closure members 19"". In addition, repositionable guide means 21"" and 23"" are shown installed in a manner that results in a product storage configuration wherein product storage areas 1.1"" and 1.2"" are established to feed products to upper column portion 1"" and product storage areas 8.1""-8.4"" are established to feed products to upper column portion 8"", and wherein the heights (and product storage capacity) of upper column portions 2""-7"" are thus effectively reduced. A better understanding of how the openings 17"", the closure members 19"", and the guide means 21"" and 23"" can be employed to establish any particular product storage configuration can be obtained by a review of U.S. Pat. No. 4,705,176, FIG. 4a of which corresponds closely to FIG. 4 herein.

It will be appreciated that with all of the embodiments of FIGS. 2-4 provision is made for increased product storage of certain types of products, i.e., products of greater demand, and for more limited product storage for other types of products, i.e., products of lesser demand. Those skilled in the art will recognize, however, that, regardless of the particular vending machine embodiment employed or the particular product storage configuration established, product delivery, at least from a vending machine whose lower portion is constructed similarly to that depicted in FIG. 1, can be readily effected by the product delivery system described in Applicant's co-pending U.S. patent application Ser. No. 230,963, as will be further apparent from the summary description of such delivery system provided hereinafter.

Products stored in embodiments of the type depicted in FIGS. 1 and 5-7 hereof may be conveniently delivered to the customer by the vend delivery systems shown in such figures, which delivery systems and the operation thereof are described in detail in Applicant's co-pending U.S. patent application Ser. No. 230,963. In brief, when a product selection for which sufficient credit has been entered is made, the vend control means for the vending machine, which vend control means often employs a programmed microprocessor, causes the motor M' (FIG. 1) to operate to move drive chain 100' in a clockwise direction to position an appropriate finger 94' or 95' adjacent the escapement member 80' (FIGS. 5 and 7), 380' (FIG. 7) or 480' (FIG. 6) associated with a product storage compartment in which are stored products of the type selected by the customer when he operated the product selection means. When the appropriate finger 94' or 95' is properly positioned, motor M' operates to cause drive chain 100' to move sufficiently in a counterclockwise direction to engage and pivot the proper escapement member 80', 380' or 480' so that the proper turnstile 60' (FIGS. 5 and 7), 360' (FIG. 7), or 460' (FIG. 6) can rotate under the weight of a product C' through a requisite degree of movement to deliver the desired product type. Those skilled in the art will recognize and understand that a programmed microprocessor with associated memory can be readily employed in the vend control means to keep track of the product storage configuration then in effect and to ensure that the motor M' will operate to advance the appropriate finger to engage the proper escapement member to effect the delivery of the desired type of product.

Figure 8:
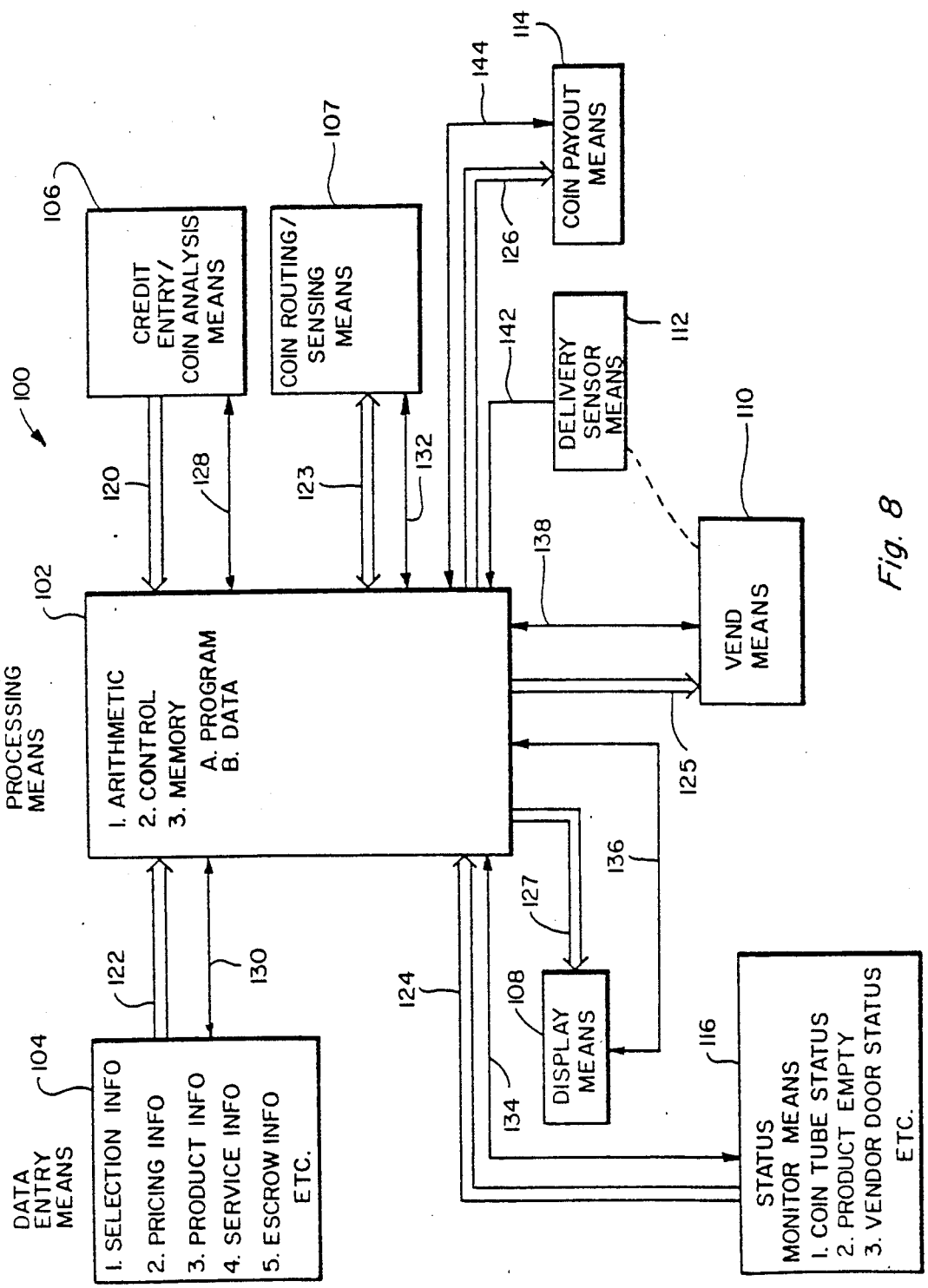
FIG. 8 is a block diagram of a typical vend control means for controlling the vending of products from the vending machine of FIG. 1.

FIG. 8 depicts in block diagram form a vend control means of the type that might typically be employed with the vending machine embodiments depicted in FIGS. 1-7 hereof. Number 100 identifies a microprocessor controlled vending system that includes a processing means 102, data entry means 104, credit entry/coin analysis means 106, coin routing/sensing means 107, display means 108, vend means 110, delivery sensor means 112, coin payout means 114, and status monitor means 116. The processing means 102 includes memory means as well as arithmetic and control means typical of a microprocessor controlled vending system. In the FIG. 8 embodiment coin analysis data may be supplied from the credit entry/coin analysis means 106 to the processing means 102 by means of a data path 120, data information of various types, including selection information, pricing information, product information, and service information, may be provided from the data entry means 104 to the processing means 102 by means of a data path 122, coin routing/sensing data may be provided from the coin routing/sensing means 107 to the processing means 102 by means of a data path 123, and status data, including coin tube status information, product empty information, and vendor status information, may be provided from the status monitor means 116 to the processing means 102 by means of a data path 124. Data for vend purposes may be provided from the processing means 102 to vend means 110 by way of data path 125, coin payout data may be provided from the processing means 102 to coin payout means 114 by way of data path 126, and information for display may be communicated from the processing means 102 to display means 108 by means of a data path 127. Various control and status signals may be intercommunicated among the components of the microprocessor controlled vending system by means of signal paths 128, 130, 132, 134, 136, 138, 142, and 144.

FIG. 9 illustrates a situation in which a particular product storage allocation configuration has been established for a vending machine constructed according to FIG. 1, wherein all of end-to-end in column portions a, b, and c thereof and all of the columns 1'-8' and their portions a, b, and c are of equal height such that equal numbers of products can be stacked in each of the portions a, b, and c of such columns, as a consequence of which the vending machine may be considered to have twenty-four storage areas of equal size, viz., the storage areas numbered 1-24 in FIG. 9. It will be appreciated that a vend delivery system for such a vending machine embodiment can be readily constructed in accordance with the teachings of co-pending U.S. patent application Ser. No. 230,963 to permit individualized vending from each of the product storage areas 1-24. Alternatively, in accordance with the embodiment depicted in FIG. 7 and the vend delivery system therefor, storage areas 1 and 2, for example, of FIG. 9 could be considered to be a single storage compartment having two equal sized storage areas each of which areas has the same capacity as storage area 24. In any event, in the product storage allocation configuration depicted in FIG. 9 the twenty-four storage areas 1-24 are allocated among eight types of products A-H such that product A is assigned four storage areas 1-4, product B is assigned four storage areas 5-8, product C is assigned four storage areas 9-12, product D is assigned three storage areas 13, 14, and 18, product E is assigned three storage areas 15, 16, and 17, product F is assigned two storage areas 19 and 20, product G is assigned two storage areas 21 and 22, and product H is assigned two storage areas 23 and 24.

If the vending machine of FIG. 9 were fully loaded with eighteen cans per storage area according to the noted product storage allocation configuration, the product storage capacity and the percentage allocation per selectable type of product would be as specified in FIG. 10. Typically, if such a product storage allocation configuration were employed, the resulting product availability at the time of next servicing of the vending machine might be that noted in FIG. 10. It will be readily apparent that one cannot easily determine from such product availability status whether or to what extent the particular product storage allocation configuration in effect corresponds to product demand, especially since it cannot be determined from such product availability status whether products A and B were depleted at an early time before servicing or just before servicing. In actuality, the sales history for the products might well have been that set forth in FIG. 11, which history reveals that product A sold out during the fourth day of a seven day service cycle and product B sold out during the fifth day of the service cycle. While such sales history might lead one studying it to conclude that adjustments in the product storage allocation configuration would be desirable, an individual servicing the vending machine generally does not have any way of determining such history and is limited to an evaluation of the product availability status at the time of servicing in making any determination regarding the acceptability of the product storage allocation configuration in effect.

FIGS. 12-14, 15-17, 18-20, 21-23, and 24-26 are figure groupings each of which includes a figure similar to FIG. 9 depicting a particular product storage allocation configuration, a figure similar to FIG. 10 identifying the product storage capacities and percentage allocations per selectable type of product for such particular product storage allocation configuration and a typical product availability status at the time of servicing, and a figure similar to FIG. 11 including a typical sales history during a service cycle of the vending machine.

In each instance, service personnel would have difficulty in determining from the product availability status at the time of servicing whether or to what extent the particular product storage allocation configuration in effect corresponds to product demand.

If the individual servicing the vending machine were particularly conscientious and industrious in trying to match product storage allocation configurations to product demand, and if he were extremely familiar with the previous allocation configurations of the vending machine and were an activist in re-allocating product storage, he might be able, by means of trial and error approaches to reconfiguration, to achieve some degree of success in determining the acceptability of a particular product storage allocation configuration, but, as will be illustrated by that which follows, his degree of success would depend upon how closely his subjective evaluations, hunches, or guesses actually match objective criteria of the type that are utilized by the present invention. By way of example, if a vending machine were first installed at a new location with the product storage allocation configuration depicted in FIG. 9, the serviceman might well suspect that some tailoring of product storage would be necessary in order to try to match product storage to product demand. If product availabilities were as noted in FIG. 10 at the time of first servicing, he might suspect that, since both products A and B were sold out at the time of servicing, and since fairly substantial quantities of products D-H remained available, some increase in product storage for products A and B was called for. Such determination would not be without doubt, however, and a decision to re-allocate product storage space in order to provide additional product storage for products A and B would require a further determination of which products' storage should be reduced to compensate for the increase in product storage for products A and B. In the absence of other information, such serviceman, if he guessed well, might re-allocate product storage to reduce product storage by one storage area for both of products E and H and to increase product storage by one storage area for both of products A and B, such that the product storage allocation configuration of FIG. 12 would result.

Unfortunately, upon next servicing the vending machine, the serviceman might well face the product availability status noted in FIG. 12. He would then be faced with the dilemma of finding that product H, whose storage space he had just reduced at last servicing, was sold out, along with products A and B, while fairly substantial quantities of products C and E remained available. If he were to make a very fortunate determination, he might re-allocate product storage to again increase product storage by one storage area for both of products A and B, to reduce the product storage by one storage area for both of products C and E, and to leave the product storage unchanged for product H, despite the fact that product H had been sold out at the time of servicing, in which event the product storage allocation configuration depicted in FIG. 15 would result. At this point, one might pause to consider how lucky a machine owner would be to have a serviceman who not only took such an interest in trying to obtain an optimal allocation configuration but who was also fortunate enough, from the limited information available to him, to be able to arrive at the determinations regarding re-allocation discussed herein.

If such super serviceman, upon next servicing the vending machine, were to encounter the product availability status noted in FIG. 16 he might well congratulate himself for his successful determinations to that point. At such servicing, although product A is still sold out, one product of product H remains available, which would lead the serviceman to believe that he had acted properly in not increasing product storage for product H even though it had been sold out at last servicing. However, product E, whose storage space he had just reduced at last servicing, is also sold out, and only product G, with 14 products available, remains available in any particularly substantial quantity. Based upon past re-allocations, the serviceman might reasonably suspect that further product storage for product A would be desirable, but he would then be forced to consider not only which product's storage should be reduced if he increases storage for product A, but also whether or not he has already reduced the storage for product E below an optimal value. If the serviceman gambles that the product storage provided for product E is appropriate despite the fact that the product was sold out at the time of servicing, and determines to increase the storage for product A by one additional storage area at the expense of product G, the product storage allocation configuration depicted in FIG. 18 would result.

Unfortunately, the serviceman could then find himself in a quandry at the next servicing when the product availability status is as noted in FIG. 19. Even though his suspicion regarding product A would appear to have been proved correct, he would then find that products E and G were both also sold out. At such point, even the super serviceman of this example might be tempted to forego further re-allocations of product storage. If, however, he were an intrepid soul, he might, as much by guess as anything else, decide to further increase product storage for product A by one additional storage area at the expense of product F and to gamble that the product storage for products E and G was appropriate. If so, the resulting product storage allocation configuration would be as depicted in FIG. 21.

At the time of next servicing the serviceman might well encounter the product availability status noted in FIG. 22. Since product A is again sold out and has been sold out at each servicing, the serviceman might well contemplate whether or not still further product storage for product A would be desirable, but he would also be faced with the unavailability of products E, F, and G at servicing and with the problem of deciding which other product should have its product storage decreased further if he desires to increase product storage for product A.

It should be observed that the product storage allocation configuration of FIG. 24 is identical to that depicted in FIG. 21 and that, instead of encountering the product availability status noted in FIG. 22 at the time of servicing, the serviceman could equally as well have encountered the product availability status noted in FIG. 25, which status might prove even more perplexing for the serviceman, especially since product F, whose product storage had just been decreased to provide greater product storage for product A is sold out while products for product A remain available. He might also question whether his decisions through several servicing cycles to leave product E with only two product storage areas allocated thereto were appropriate since product E continues to be sold out. Furthermore, he now finds that product H is again sold out, which had not happened since he first reduced the product storage allocated to product H to only a single storage area.

The foregoing illustrates how difficult it would be for even an extremely conscientious and dedicated serviceman with a great deal of familiarity with an individual vending machine and its service history to be able to determine whether the product storage allocation configuration for the mix of products vended by such vending machine conforms within acceptable norms to the demand for such products. It will be recognized that such determinations would be more difficult for a serviceman who was not familiar with the service history of the vending machine, particularly for a serviceman who was new to a route or who only occasionally serviced a particular vending machine. Moreover, any serviceman who wished to be able to maintain a familiarity with the vending machines serviced by him would quickly find himself involved with the recordation and maintenance of records for each of such vending machines, which recordkeeping could be quite extensive for a serviceman who serviced a large quantity of machines and is a task that most servicemen would not wish to undertake.

With the present invention, service personnel can readily ascertain whether or not the product storage allocation configuration then in effect for any given vending machine is acceptable based upon the historical demand for the various products vended by such vending machine. From FIGS. 11, 14, 17, 20, 23, and 26, which figures include typical sales history data for the product storage allocation configurations depicted in FIGS. 9, 12, 15, 18, 21, and 24, respectively, it can be observed that, if records of product demand are maintained up until the time of first product sell-out, it is possible to calculate demand percentages by product type, which demand percentages can then be utilized to determine the extent to which such demand percentages deviate from the then-current product storage allocation percentages of the various product types and whether such deviations are within acceptable norms.

As may be noted from FIG. 11, the product storage allocation percentages for products A and B are considerably lower than the product demand percentages calculated therefor, while the product storage allocation percentages for all of the other products C-H are greater than the product demand percentages calculated therefor. In view of the fact that each product storage area 1-24 is equivalent to approximately 4.17% of the total product storage available, it would be reasonable to decide that any deviation percentage of less than one-half of the percentage value of an individual product storage area, i.e., approximately 2.08%, would be considered within acceptable norms. The effect of such a decision would be to establish a window of acceptability around the product storage allocation percentage previously established for each product type.

When such a window of acceptability is applied with respect to the product sales activity noted in FIG. 11, it is found that a significant mismatch exists between the product storage allocation configuration in effect and the demand for the various product types. Only the storage allocation for product F is found to be within an acceptability norm. The storage allocations for products A and B are both found to be low while storage allocations for products C-E, G, and H are found to be high. By using increasingly larger windows the severity of the mismatch for the various product types can be determined. Such windows of acceptability can be employed as one type of acceptability standards data. As can be observed from FIG. 11, the deviations in percentage of product demand from product allocation are greater than 4.17 for all of products A-D, G, and H, are greater than 6.25 for all of products A-C, and are greater than 8.33 for product A. If such information were made available to service personnel during servicing, such as by way of a display or other communications means, such personnel would not only know that a mismatch existed between product storage allocation and product demand, but they would be in a better position to be able to re-allocate product storage in a manner that would better match product demand.

In a basic form of the invention, service personnel might be made aware of the acceptability or unacceptability of the product storage allocation configuration then in effect by the illumination of a status light on the vending machine or by a simple display or other form of communication. In another form, individual status lights for each product type could be provided, and such lights could be made to remain illuminated for each product whose storage is lower than desirable and to blink for each product whose storage is greater than desirable. In more sophisticated forms, information could be displayed under microprocessor control in response to various actions by service personnel, such as in response to certain inputs made by service personnel from data entry means of various types.

If deviation information of the type appearing in the lower portion of FIG. 11 were available to a serviceman, he might reasonably conclude that the product storage for products A and B should be increased and that the product storage for all of products C-E, G, and H could be reduced. Since the storage for product A appears low by greater than two storage areas, since the storage for product B appears low by greater than one and one-half storage areas, since the storage for products C, D, G, and H appear high by greater than one storage area, and since the storage for product E appears high by greater than one-half of a storage area, it would be reasonable for a serviceman to re-allocate product storage space to provide three additional storage areas for product A, two additional storage areas for product B, and one fewer storage areas for each of products C-E, G, and H. If such re-allocation were effected, the resulting product storage allocation configuration would be that depicted in FIG. 18.

Similar analyses may be performed with regard to the information appearing in the lower portions of FIGS. 14, 17, 20 23, and 26. Interestingly, from the information appearing in each of FIGS. 11, 14, and 17, one can reasonably reach a determination that storage space should preferably be re-allocated to result in the product storage allocation configuration depicted in FIG. 18. Quite clearly, use of the present invention can effect a significant improvement over the trial and error approach discussed hereinabove. The information appearing in FIG. 20 indicates that the product storage allocation configuration depicted in FIG. 18 proved unacceptable for the service cycle covered by FIG. 20 in that the product storage for product A was low by greater than one-half of a storage area and the product storage for product F was high by greater than one-half of a storage area. The most reasonable re-allocation in view of such information would be that depicted in FIG. 21. The information appearing in FIGS. 23 and 26 indicates that the product storage allocation configuration of FIG. 21 (and FIG. 24) proved acceptable for the service cycles noted in FIGS. 22-23 and 25-26.

It should be noted that there may be occasions when a deviation of greater than the generally acceptable amount is detected for only a single product. In such circumstances, a microprocessor might well be programmed to disregard any single out-of-bounds occurrence since offsetting product re-allocation may well not be possible and since, in some instances, such out-of-bounds occurrence might be the result of some quirk in demand during a particular service cycle. In this last regard, systems can be so programmed to consider not only the most recent service cycle in determining the acceptability of the product storage allocation configuration, but also the product demand during previous service cycles. FIG. 27 illustrates how such multi-cycle product demand information can be employed.

FIG. 27 provides in summary fashion typical vend activity until first product sell-out over four service periods for a vending machine whose product storage allocation configuration is as depicted in FIG. 24. At each of the first three servicings, all deviation percentages were found to be within 2.08 of the allocated product storage percentages, but, at the fourth servicing, the deviation percentage for product F is found to be out-of-bounds. As is apparent from the data in FIG. 27, if total product demand until first sell-out for all four of the service cycles is utilized, however, instead of product demand during only the fourth service cycle, no problem is found to exist.

Figure 28:
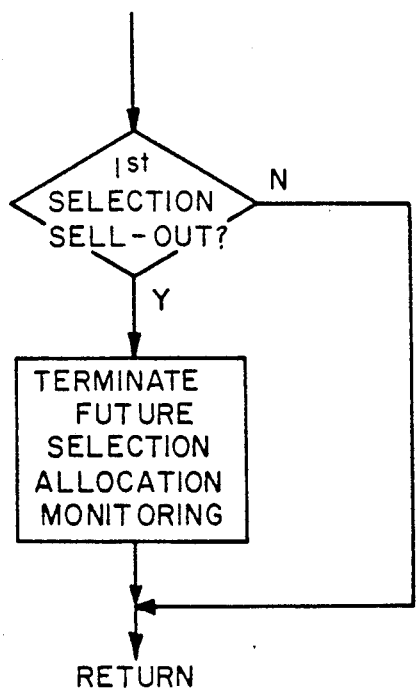
FIGS. 28 and 29 depict portions of typical subroutines that may be employed during the course of a vend operation while the vending machine is in sales mode to effect the recordation and retention of product selection information required by the selection allocation monitoring means of the present invention.
Figure 29:
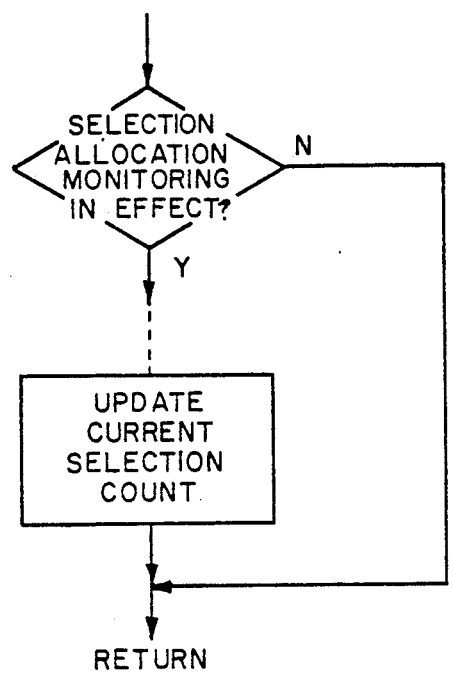
Figure 30:
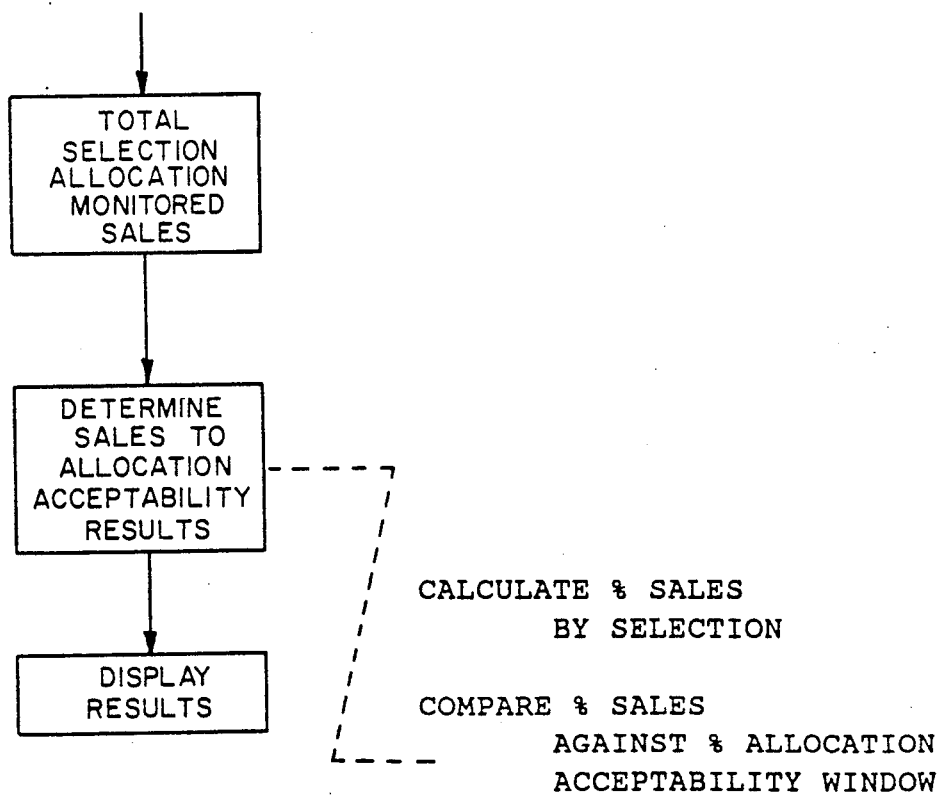
FIG. 30 depicts a portion of a typical subroutine that may be employed while the vending machine is in a service mode to determine from recorded product demand information whether the product allocation configuration is acceptable or should be revised.

It will be recognized from what has been discussed hereinbefore that it is important to the practice of this invention that a record of product demand be produced as products are being vended, that further production of such record be inhibited when any product first sells out, that the recorded product demand for the various product types be compared in some fashion against the product storage allocated to each type of product, and that some indication of whether or not the product storage allocation configuration then in effect is acceptable be communicated to authorized personnel. FIGS. 28 and 29 depict typical subroutine portions that may be employed during the course of a vend operation while the vending machine is in a sales mode to, in the case of FIG. 28, terminate selection allocation monitoring, i.e., inhibit further product demand recording, when a first product sell-out has been detected, and to, in the case o FIG. 29, update the current selection count, i.e., increment the recorded product demand count for the particular product being vended. FIG. 30 depicts a representative subroutine portion of the type that might typically be employed during a service mode to determine from the recorded product demand data whether the product storage allocation configuration is acceptable, such as by totaling .the selection allocation monitored sales and deliveries, determining from such totals and from product storage allocation configuration information the allocation configuration acceptability results, and communicating such results to authorized personnel, e.g., by displaying such results.

In the foregoing discussions and examples the first sellout of a product type has served as a terminating event for the recordation of product demand data. It should be recognized, however, that the occurrence of other events may also serve as or constitute terminating events. For example, occasions may often arise where no product type sells out prior to machine servicing. In such cases, machine servicing may constitute the terminating event for product demand data recordation. In other settings, it may be desired that product demand data be recorded only for some set period of time, in which case the timing out of a timer or other timing means could constitute the terminating event for product demand recordation. As will be apparent from what has already been said, numerous other events could also serve as terminating events. In most of such instances, though, it will still be desired that sellout of a product type prior to the occurrence of an event that might otherwise be considered a terminating event would serve as an overriding terminating event. There may, however, even be exceptions to this. For example, the vending system could be so designed that the sellout of a product type would not be revealed to a customer until after he has made an appropriate product selection for the amount of credit entered. In such case, the processing means of the vending system might be programmed to update the product demand information in response to the first (and only the first) vend selection made during a vend operation, regardless of whether any product type is sold out. In such event, if a product type were sold out, the product request for the desired product would be noted and recorded, but any subsequent product request during the same vend operation, such as might typically be made by the customer after notification to him of the sold out condition of the desired product type, would not be counted on the grounds that it reflects only a substitute or secondary demand.

Actual updating of the recorded product demand data may be effected by the processing means at any appropriate time during the course of a vend operation, depending upon the particular vending systems, the period over which product demand data is desired, and the particular control program utilized or the particular control method followed. With a microprocessor controlled vending system the microprocessor may be programmed to be responsive to any of numerous events to effect an updating of the recorded product demand data, including such events as recognition of a vend selection, activation of the vend delivery means, or recognition of product delivery by the delivery sensor means, to name only a few.

It should also be appreciated that, although machine servicing will often include product restocking, machine servicing is not limited to product restocking, and servicing may sometimes not involve product restocking. In some instances servicing of the machine may involve the entry of data or information into the machine or the retrieval of some data or information therefrom apart from restocking, such as by means of the data entry means 104, the status monitor means 116, and/or the display means 108 of FIG. 8, perhaps even for the purpose of checking the consistency between product demand and product storage allocation before product restocking and/or product storage allocation is scheduled or becomes necessary, and, in certain instances, such information entry or retrieval may even involve or require the use of portable interrogation means, transmission and reception means, or phone lines or other data link means to remote devices of various types.

Additionally, although the means for communicating information to authorized personnel has generally been treated and discussed herein as being a visual display means, other communication means, including, without limitation as to other types, audio means of various types, could also be employed.

From the foregoing it will be apparent that there have bee shown and described a vend space allocation monitor means and method, which means and method fulfill the objects and advantages sought therefor. It will be further apparent to those skilled in the art that man embodiments other than the preferred forms discussed herein and many variations of the method other than those described herein are also possible and contemplated, including many changes in, modifications to, and other uses and applications of the subject vend space allocation monitor means and method. All such embodiments, variations, changes, modifications, and other uses and applications that do not depart from the spirit and scope of this invention are deemed to be covered by this invention, which is limited only by the claims which follow.

What is claimed is:

1. Vend space allocation monitor means for a vending system capable of vending from among a plurality of classes of selectable vendable products a product from a selected product class, which vending system has a plurality of product storage areas for vend product storage and an established vend space allocation configuration allocating the product storage areas to the classes of selectable vendable products, said vend space allocation monitor means comprising a vend selection monitoring means for monitoring over a period of time the historical demand for the various classes of selectable vendable products, means for determining, based at least in part upon said historical demand, whether such established vend space allocation configuration is consistent with selection demand norms for the classes of selectable vendable products, and means for communicating to authorized personnel such determination, whereby such authorized personnel may, if they so desire, undertake a reconfiguration of vend space allocation for such vending system.

2. The vend space allocation monitor means of claim 1 wherein said vend selection monitoring means includes data storage means for storing historical demand data representative of the historical demand over the period of time for the plurality of classes of selectable vendable products and said determining means includes means for retrieving said historical demand data.

3. The vend space allocation monitor means of claim 2 wherein said historical demand data upon which such determination is based is the historical demand data for the period of time prior to the first sellout of any class of selectable vendable product.

4. The vend space allocation monitor means of claim 2 including a processing means, said processing means forming portions of said vend selection monitoring means and said determining means.

5. The vend space allocation monitor means of claim 4 wherein said vend selection monitoring means includes vend selection entry means and said processing means is operable during vending operations to update the historical demand data stored in said data storage means to reflect the vend selection for each product vend operation.

6. The vend space allocation monitor means of claim 5 wherein said vend selection monitoring means includes means for monitoring the product availability status for each class of selectable vendable products and for detecting when a class of selectable vend products becomes sold out, said processing means being responsive to the detection of the first sold out condition for a class of selectable vendable products to prevent further updating during subsequent vending operations of historical demand data stored in said data storage means.

7. The vend space allocation monitor means of claim 5 wherein the vending system includes credit entry means and said processing means is responsive to the detection of a vend selection for which sufficient credit has been entered to effect the updating of said historical demand data.

8. The vend space allocation monitor means of claim 5 wherein the vending system includes vend means and said processing means is operable to effect the updating of said historical demand data when operation of the vend means is effected by said processing means.

9. The vend space allocation monitor means of claim 5 wherein said vend selection monitoring means includes delivery sensor means for detecting delivery of a product, said processing means being responsive to the detection of a product delivery to effect the updating of said historical demand data.

10. The vend space allocation monitor means of claim 5 wherein said processing means includes memory means for storing data therein and means for retrieving such data therefrom, said data storage means for storing historical demand data forming a portion of said memory means, said memory means also including a portion thereof for storing product storage allocation configuration data representative of the established product storage allocation configuration, and wherein, upon the occurrence of a terminating event, said processing means is operable to determine from said historical demand data and from said product storage allocation configuration data stored in said memory means the degree of conformance between said stored historical demand data and said stored product storage allocation configuration data, such degree of conformance being indicative of whether the established vend space allocation configuration is consistent with selection demand norms.

11. The vend space allocation monitor means of claim 10 wherein servicing of the vending system constitutes said terminating event.

12. The vend space allocation monitor means of claim 11 wherein the vending system is operable in a vending mode of operation and in a service mode of operation, initiation of a service mode of operation constituting said terminating event.

13. The vend space allocation monitor means of claim 10 wherein the vending system includes means for detecting a machine condition indicative of a service mode of operation of the vending system, said processing means operatively connected to such detecting means and responsive to detection of a machine condition indicative of a service mode of operation to determine whether the established vend space allocation configuration is consistent with selection demand norms.

14. The vend space allocation monitor means of claim 13 wherein the means for detecting a machine condition includes status monitor means and the machine condition indicative of a service mode of operation is a vendor door open condition.

15. The vend space allocation monitor means of claim 10 wherein the vending system includes service information entry means for entering service information, said processing means operatively connected to the service information entry means and responsive to entry of service information to determine whether the established vend space allocation configuration is consistent with selection demand norms, the entry of such service information constituting said terminating event.

16. The vend space allocation monitor means of claim 10 wherein the first sellout of a class of selectable vendable products constitutes said terminating event.

17. The vend space allocation monitor means of claim 10 wherein said terminating event for a given period of time is the first event to occur from among a plurality of possible terminating events.

18. The vend space allocation monitor means of claim 17 wherein said possible terminating events include both first sellout of a class of selectable vendable products and servicing of the vending system.

19. The vend space allocation monitor means of claim 17 wherein said vend selection monitoring means includes timing means and one of said possible terminating events is the timing out of said timing means.

20. The vend space allocation monitor means of claim 5 wherein the vending system includes credit entry means and said processing means is responsive to the first vend selection entered during a vend operation for a credit entry of an amount sufficient for the vend cost of such vend selection to update said historical demand data.

21. The vend space allocation monitor means of claim 20 wherein said processing means includes memory means for storing data therein and means for retrieving such data therefrom, said data storage means for storing historical demand data forming a portion of said memory means, said memory means also including a portion thereof for storing product storage allocation configuration data representative of the established product storage allocation configuration, and wherein, upon the occurrence of a terminating event, said processing means is operable to determine from said historical demand data and from said product storage allocation configuration data stored in said memory means the degree of conformance between said stored historical demand data and said stored product storage allocation configuration data, such degree of conformance being indicative of whether the established vend space allocation configuration is consistent with selection demand norms.

22. The vend space allocation monitor means of claim 21 wherein servicing of the vending system constitutes said terminating event.

23. The vend space allocation monitor means of claim 21 wherein the vending system is operable in a vending mode of operation and in a service mode of operation, initiation of a service mode of operation constituting said terminating event.

24. The vend space allocation monitor means of claim 21 wherein said vend selection monitoring means includes timing means and the timing out of said timing means constitutes said terminating event.

25. The vend space allocation monitor means of claim 21 wherein said terminating event for a given period of time is the first event to occur from among a plurality of possible terminating events.

26. The vend space allocation monitor means of claim 10 wherein said memory means includes a portion thereof for storing acceptability standards data, said processing means operable to calculate for each class of selectable vendable products a value representative of the difference between product storage allocated and the historical product demand for products of such class of selectable vendable products and to compare such calculated value against said acceptability standards data to obtain result data, said result data being indicative of whether the established vend space allocation configuration is consistent with selection demand norms.

27. The vend space allocation means of claim 26 wherein said processing means is operable to effect communication to authorized personnel of said result data by said means for communicating.

28. The vend space allocation monitor means of claim 27 wherein said means for communicating includes means for visually indicating whether the established vend space allocation configuration is consistent with selection demand norms.

29. The vend space allocation monitor means of claim 28 wherein said means for visually indicating whether the established vend space allocation configuration is consistent with selection demand norms includes light means.

30. The vend space allocation monitor means of claim 29 wherein said light means includes a plurality of lights, each class of selectable vendable type of products having a light associated therewith, the visual condition of said lights corresponding to said result data.

31. The vend space allocation monitor means of claim 28 wherein said means for visually indicating whether the established vend space allocation configuration is consistent with selection demand norms includes display means for displaying said result data.

32. The vend space allocation monitor means of claim 27 wherein said means for communicating includes audio means.

33. The vend space allocation monitor means of claim 27 wherein said means for communicating includes means operable by authorized personnel to effect such communication of said result data.

34. The vend space allocation monitor means of claim 10 wherein the vending system includes means operable to place such system in a service mode of operation, said processing means operable when the vending system is in a service mode of operation to effect, based upon the degree of conformance between said stored historical demand data and said stored product storage allocation configuration data, communication to authorized personnel by said means for communicating of an indication whether the established vend space allocation configuration is consistent with selection demand norms.

35. The vend space allocation monitor means of claim 34 wherein the vending system includes data entry means operable by authorized personnel while the vending system is in a service mode of operation to provide data to said processing means and wherein said processing means is responsive to the receipt of such data to effect such communication of said indication.

36. The vend space allocation monitor means of claim 35 wherein said means for communicating includes a display means.

37. The vend space allocation monitor means of claim 4 wherein said processing means includes memory means for storing data therein and means for retrieving such data therefrom, said data storage means for storing historical demand data forming a portion of said memory means, said memory means also including a portion thereof for storing product storage allocation configuration data representative of the established product storage allocation configuration, said processing means also including a microprocessor programmed to:

(A) update the historical demand data stored in said data storage means to reflect the vend selection for each product vend operation while the vending system is in a vending mode of operation until the occurrence of a terminating event, (B) respond to the occurrence of a terminating event to prevent further updating of historical demand data stored in said data storage means, (C) determine from said historical demand data and from said product storage allocation configuration data stored in said memory means the degree of conformance between said stored historical demand data an said stored product storage allocation configuration data, such degree of conformance being indicative of whether the established vend space allocation configuration is consistent with selection demand norms, (D) effect, based upon the degree of conformance between said stored historical demand data and said stored product storage allocation configuration data, communication to authorized personnel by said means for communicating of an indication whether the established vend space allocation monitor means is consistent with selection demand norms.

38. The vend space allocation monitor means of claim 37 wherein servicing of the vending system constitutes said terminating event.

39. The vend space allocation monitor means of claim 37 wherein the vending system includes service information entry means for entering service information, said processing means operatively connected to the service information entry means and responsive to entry of service information to determine whether the established vend space allocation configuration is consistent with selection of system demand norms, the entry of such service information constituting said terminating event.

40. The vend space allocation monitor means of claim 37 wherein the first sellout of a class of selectable vendable products constitutes said terminating event.

41. The vend space allocation monitor means of claim 37 wherein said terminating event for a given period of time is the first event to occur from among a plurality of possible terminating events.

42. The vend space allocation monitor means of claim 41 wherein said possible terminating events include both first sellout of a class of selectable vendable products and servicing of the vending system.

43. The vend space allocation monitor means of claim 37 wherein said selection monitoring includes timing means and one of said possible terminating events is the timing out of said timing means.

44. The vend space allocation monitor means of claim 37 wherein said microprocessor is programmed in performing step (C) to:

(1) calculate for each class of selectable vendable products a value representative of the difference between product storage allocated and the historical product demand for products of such class of selectable vendable products, and (2) compare such calculated value against said acceptability standards data.

45. The vend space allocation monitor means of claim 44 wherein result data is obtained in the performance of step (2), said result data being indicative of whether the established vend space allocation configuration is consistent with selection demand norms.

46. The vend space allocation monitor means of claim 45 wherein said microprocessor is programmed in performing step (D) to effect communication to authorized personnel by said means for communicating of said result data.

47. The vend space allocation monitor means of claim 4 wherein said processing means includes memory means for storing data therein and means for retrieving such data therefrom, said data storage means for storing historical demand data forming a portion of said memory means, said memory means also including a portion thereof for storing product storage allocation configuration data representative of the established product storage allocation configuration, said processing means also including a microprocessor programmed to operate, first, during a vending mode of operation, to:
  (A) update the historical demand data stored in said data storage means to reflect the vend selection for each product vend operation until any class of selectable vendable products has first become sold out, and
  (B) respond to any detection of a first sold out condition for a class of selectable vendable products to prevent further updating during subsequent vending operations of historical demand data stored in said means for storing historical demand data,
and, subsequently, during a service mode of operation, to:
  (C) determine from said historical demand data and from said product storage allocation configuration data stored in said memory means the degree of conformance between said stored historical demand data and said stored product storage allocation configuration data, such degree of conformance being indicative of whether the established vend space allocation configuration is consistent with selection demand norms, and
  (D) effect, based upon the degree of conformance between said stored historical demand data and said stored product storage allocation configuration data, communication to authorized personnel by said means for communicating of an indication whether the established vend space allocation monitor means is consistent with selection demand norms.

48. The vend space allocation monitor means of claim 47 wherein the vending system includes means for detecting a machine condition indicative of a service mode status and said processing means is operatively connected to such detecting means, and wherein said processing means is responsive to detection of a machine condition indicative of a service mode status to cause the vending system to enter a service mode of operation.

49. The vend space allocation monitor means of claim 48 wherein the means for detecting a machine condition includes status monitor means and the machine condition indicative of a service mode of operation is a vendor door open condition.

50. The vend space allocation monitor means of claim 47 wherein the vending system includes data entry means operable by authorized personnel to enter service information and said processing means is operatively connected to the data entry means, and wherein said processing means is responsive to service information entered at the data entry means to cause the vending system to enter a service mode of operation.

51. The vend space allocation monitor means of claim 4 wherein the vending system includes vend means and said processing means is operable to effect the updating of said historical demand data when operation of the vend means is effected by said processing means.

52. The vend space allocation monitor means of claim 4 wherein said vend selection monitoring means includes delivery sensor means for detecting delivery of a product, said processing means being responsive to the detection of a product delivery to effect the updating of sad historical demand data.

53. The vend space allocation monitor means of claim 4 wherein said processing means includes memory means for storing data therein and means for retrieving such data therefrom, said data storage means for storing historical demand data forming a portion of said memory means, said memory means also including a portion thereof for storing product storage allocation configuration data representative of the established product storage allocation configuration, and wherein, upon the occurrence of a terminating event, said processing means is operable to determine from said historical demand data and from said product storage allocation configuration data stored in said memory means the degree of conformance between said stored historical demand data and said stored product storage allocation configuration data, such degree of conformance being indicative of whether the established vend space allocation configuration is consistent with selection demand norms.

54. The vend space allocation monitor means of claim 53 wherein said memory means includes a portion thereof for storing acceptability standards data, said processing means operable to calculate for each class of selectable vendable products a value representative of the difference between product storage allocated and the historical product demand for products of such class of selectable vendable products and to compare such calculated value against said acceptability standards data to obtain result data, said result data being indicative of whether the established vend space allocation configuration is consistent with selection demand norms.

55. The vend space allocation monitor means of claim 53 wherein the vending system includes means operable to place such system in a service mode of operation, said processing means operable when the vending system is in a service mode of operation to effect, based upon the degree of conformance between said stored historical demand data and said stored product storage allocation configuration data, communication to authorized personnel by said means for communicating of an indication whether the established vend space allocation configuration is consistent with selection demand norms.

56. A method for determining and for indicating to authorized personnel whether, for a vending system capable of vending from among a plurality of classes of selectable vendable products a product from a selected product class, which vending system has a plurality of product storage areas for vend product storage and an established vend space allocation configuration allocating the product storage areas to the classes of selectable vendable products, an established product storage allocation configuration is consistent with selection demand norms, comprising the steps of:
  (A) recording and updating for product vend operations as products are vended over a period of time the product demand by class of product, (B) comparing the recorded product demand for such period of time for the classes of products against the product storage allocated for the classes of products by the established product storage allocation configuration to determine the deviation in product demand from product storage allocated, (C) comparing such determined deviation against acceptability norms to obtain an acceptability indication, (D) effecting communication of such acceptability communication to authorized personnel.

57. The method of claim 56 wherein step (A) is terminated by the occurrence of a terminating event.

58. The method of claim 57 wherein servicing of the vending system constitutes said terminating event.

59. The method of claim 57 wherein the vending system is operable in a vending mode of operation and in a service mode of operation, initiation of a service mode of operation constituting said terminating event.

60. The method of claim 57 wherein the first sellout of a class of selectable vendable products constitutes said terminating event.

61. The method of claim 57 wherein said terminating event for a given period of time is the first event to occur from among a plurality of possible terminating events.

62. The method of claim 61 wherein said possible terminating events include both first sellout of a class of selectable vendable products and servicing of the vending system.

63. The method of claim 61 wherein said selection monitoring means includes timing means and one of said possible terminating events is the timing out of said timing means.

64. A method for determining and for indicating to authorized personnel whether, for a vending system capable of vending from among a plurality of classes of selectable vendable products a product from a selected product class, which vending system has a plurality of product storage areas for vend product storage and an established vend space allocation configuration allocating the product storage areas to the classes of selectable vendable products, an established product storage allocation configuration is consistent with selection demand norms, comprising the steps of:

(A) providing means for monitoring and recording product demand and for communicating information to authorized personnel, (B) monitoring the demand for the various classes of selectable vendable products over a period of time and recording such historical demand, (C) determining, based at least in part upon said historical demand, whether the established vend space allocation configuration is consistent with selection demand norms for the classes of selectable vendable products, and (D) communicating such determination to authorized personnel.

65. Vend space allocation monitor means for a vending system that has a plurality of distinguishable product storage areas for storage prior to vending of a plurality of distinguishable types of vendable products, wherein the number of distinguishable product storage areas exceeds the number of distinguishable types of vendable products intended to be vended by such vending system and wherein at least certain of the distinguishable product storage areas are configurable with one another to permit the vending of a common type of vendable product therefrom, such vending system including means operable by authorized personnel to establish and form from the plurality of distinguishable product storage areas a plurality of product storage allocation areas, each such product storage allocation area adapted to hold therein a plurality of products of a given type, the plurality of product storage allocation areas so established defining an established vend space allocation configuration, means for dispensing from each such product storage allocation area the products stored therein, means for controlling in response to an authorized request the dispensing of a requested distinguishable type of vendable product, and data storage means for storing historical demand data for each distinguishable type of vendable product, said vend space allocation monitor means comprising vend selection monitoring means for monitoring over a period of time the historical demand for the various types of vendable products, processing means operatively connected to said vend selection monitoring means and said data storage means and operable as product demand is monitored to updata said historical demand data stored in said data storage means to reflect the historical demand for the various types of vendable products, and communication means, said processing means operable in response to a terminating event for the time period to determine for each type of distinguishable product, based upon the historical demand data stored in said data storage means, whether the established vend space allocation configuration is consistent with selection demand norms for each type of distinguishable product, and to effect the communication to authorized personnel by said communication means of information indicative of such determination.

66. The vend space allocation monitor means of claim 65 wherein servicing of the vending system constitutes said terminating event.

67. The vend space allocation monitor means of claim 65 wherein the vending system is operable in a vending mode of operation and in a service mode of operation, initiation of a service mode of operation constituting said terminating event.

68. The vend space allocation monitor means of claim 65 wherein the vending system includes means for detecting a machine condition indicative of a service mode of operation of the vending system, said processing means operatively connected to such detecting means and responsive to detection of a machine condition indicative of a service mode of operation to determine whether the established vend space allocation configuration is consistent with selection demand norms.

69. The vend space allocation monitor means of claim 65 wherein the vending system includes service information entry means for entering service information, said processing means operatively connected to the service information entry means and responsive to entry of service information to determine whether the established vend space allocation configuration is consistent with selection demand norms, the entry of such service information constituting said terminating event.

70. The vend space allocation monitor means of claim 65 wherein the first sellout of a class of selectable vendable products constitutes said terminating event.

71. The vend space allocation monitor means of claim 65 wherein said terminating event for a given period of time is the first event to occur from among a plurality of possible terminating events.

72. The vend space allocation monitor means of claim 71 wherein said possible terminating events include both first sellout of a class of selectable vendable products and servicing of the vending system.

73. The vend space allocation monitor means of claim 71 wherein said vend selection monitoring means includes timing means and one of said possible terminating events is the timing out of said timing means.

* * * * *

UNITED STATES PATENT AND TRADEMARK OFFICE
CERTIFICATE OF CORRECTION

PATENT NO. : 5,029,098

DATED : July 2, 1991

INVENTOR(S) : Joseph L. Levasseur

It is certified that error appears in the above—identified patent and that said Letters Patent is hereby corrected as shown below:

On the title page:

In the Abstract, line 4, delete "of" and insert --a--.

In the Abstract, line 16, delete "communciating" and insert --communicating--.

Column 2, line 19, delete "o" and insert --of--.

Column 3, line 49, "Product" should be --product--.

Column 12, line 48, delete "o" and insert --of--.

Column 14, line 4, "bee" should be --been--.

Column 18, line 13, "an" should be --and--.

Column 20, line 11, "sad" should be --said--.

Column 22, line 22, "updata" should be --update--.

Signed and Sealed this

Sixth Day of October, 1992

Attest:

DOUGLAS B. COMER

Attesting Officer

Acting Commissioner of Patents and Trademarks